United States Patent
Shioda et al.

(10) Patent No.: US 7,043,440 B2
(45) Date of Patent: May 9, 2006

(54) PLAY BACK APPARATUS

(75) Inventors: Takehiko Shioda, Saitama (JP);
Masami Suzuki, Saitama (JP); Satoshi Odagawa, Saitama (JP); Takayuki Akimoto, Saitama (JP); Masahiro Okamura, Saitama (JP); Yasuteru Kodama, Saitama (JP); Manabu Nohara, Saitama (JP); Katsunori Arakawa, Saitama (JP); Osamu Yamazaki, Saitama (JP); Hiroto Inoue, Saitama (JP)

(73) Assignee: Pioneer Corporation, Tokyo (JP)

( * ) Notice: Subject to any disclaimer, the term of this patent is extended or adjusted under 35 U.S.C. 154(b) by 597 days.

(21) Appl. No.: 09/829,988

(22) Filed: Apr. 11, 2001

(65) Prior Publication Data

US 2001/0029456 A1 Oct. 11, 2001

(30) Foreign Application Priority Data

Apr. 11, 2000 (JP) ............................. 2000-108764

(51) Int. Cl.
*G10L 19/00* (2006.01)

(52) U.S. Cl. ...................... 704/500; 704/503; 704/504; 369/47.23; 369/48

(58) Field of Classification Search ............. 369/47.23, 369/44.28, 48; 386/98; 704/500–504, 214–215, 704/208
See application file for complete search history.

(56) References Cited

U.S. PATENT DOCUMENTS

| 5,477,487 | A | | 12/1995 | Greenberg |
| 5,748,585 | A | * | 5/1998 | Tsukamoto et al. ...... 369/47.23 |
| 5,774,863 | A | | 6/1998 | Okano et al. |
| 5,809,454 | A | * | 9/1998 | Okada et al. ............... 704/214 |
| 5,970,031 | A | * | 10/1999 | Huang et al. ............ 369/44.28 |
| 6,061,496 | A | * | 5/2000 | Nakamura et al. ............ 386/98 |

FOREIGN PATENT DOCUMENTS

EP 0 597 483 A1 5/1994

* cited by examiner

*Primary Examiner*—Susan McFadden
*Assistant Examiner*—Huyen X. Vo
(74) *Attorney, Agent, or Firm*—Sughrue Mion, PLLC

(57) ABSTRACT

When the quick traverse play back command (or, quick returning play back command) of the audio information by the compression audio information is given to the play back apparatus, by the control of the control section, the special audio according to the temporarily stored data stored in the first storage means is repeatedly played back, instead of the play back of the audio by the ordinary play back operation.

20 Claims, 13 Drawing Sheets

PLAY BACK APPARATUS

BACKGROUND OF THE INVENTION

1. Field of the Invention

The present invention relates to a play back apparatus for conducting the play back of a sound such as the music by the compression data in which the sound information (audio information) is high efficiently coded by a coding method such as the JPEG audio.

2. Related Art

Conventionally, there is a CD (compact disk) as a representative example of a recording medium of the audio information such as music. In this disk, the audio information is held by pit rows spirally formed in high density on a single surface of the 12 cm diameter disk, and by optically reads out the information by a CD player as a play back apparatus, the binary coded digital signal is generated corresponding to the pit shape, and the play back of the audio can be conducted according to the signal. In the CD, the music of maximum 74 minutes of 2 channels per each disk can be recorded as the non-compressed digital audio data by so-called the linear PCM (Pulse Code Modulation), and the CD is widely used as the recording medium which is small sized and has the good portability.

Further, recently, a recording medium which has a greatly smaller size and more excellent portability, and in which a larger amount of audio information, than the above CD, can be recorded, and its play back apparatus are required, and as an example, a solid state memory as the recording medium in which the audio information is recorded as the compression data, and a play back apparatus such as so-called solid player to play back the audio information such as the music according to the compression data stored in the solid state memory, are proposed.

In the compression data, there is the compression bit stream data which is coded by, for example, MPEG audio method. FIG. 13 is a rough sketch+showing an example of a physical format of the compression bit stream data by the MPEG audio method, and herein, this drawing is shown in the data format coded by MPEG-4 Twin VQ which is one of the MPEG-4 Audio GA coding.

As shown in FIG. 13, the compression bit stream data of the method according to the conversion coding such as the MPEG-4 Twin VQ is structured by a format in such a manner that the bit rows as the result in which a predetermined number of samples of the audio information are collected and grouped to 1 frame, and are compression coded, continue for each frame. The compression bit stream data is structured by a fixed length frame in which fixed bits are allotted to each frame. Further, herein, a case is supposed in which, in a top of each frame, a header area having a frame synchronous word or the information to control the operation mode of the decoder is provided, and in the header, a frame number N (=1, 2, 3, 4, . . . N, N+1, . . . ) expressing the continued order of each frame of the compression bit stream data is included. Further, in the compression bit stream data possessed by each frame, the quantification index information for decoding the MDCT coefficient, and the window information required when the MDCT is inversely converted, and the spectrum envelope and the gain quantification parameter information are included.

Such the compression bit stream data is sent to the personal computer from, for example, the distributor of the data through the internet, and when the user down-loads this data into the fixed memory mounted in the personal computer, the data is stored in the fixed memory as the audio information.

Then, when the solid state memory in which the audio information is stored as described above, is mounted in the play back apparatus by the user, and the play back command of the audio information is given, in the play back apparatus, the control section conducts the control to successively read out the compression bit stream data stored in the solid state memory corresponding to the command, in the buffer memory, and to supply it, and a predetermined amount of data is accumulated once in the buffer memory, and after that, the data accumulated in the buffer memory is successively supplied intermittently from the buffer memory to the compression decoder for each of continued predetermined frame number units.

The compression decoder makes the data of the predetermined frame number units supplied from the buffer memory, synchronize with the header of each frame, and reads-in it for each frame and conducts the decoding conversion processing, and after that, successively generates the non-compression PCM audio data according to the decoding conversion processing. The generated PCM audio data is sent to the D/A converter, and is conversion processed into the analog audio signal and supplied to an amplifier. The amplifier amplifies the analog audio signal and supplies to a speaker. As the result, the play back sound of the music corresponding to the analog audio signal is produced from the speaker.

Further, while the play back apparatus plays back the music, when the user continues the pressing of the quick traverse command (FF command) button provided on the playback apparatus, the quick traverse play back command is given, and after that, when the user stops the pressing of the FF button, the quick traverse play back command is released, and the play back apparatus returns to the ordinary play back operation again.

When the quick traverse play back command is given while the play back apparatus plays back the music, the control section of the play back apparatus interrupts the decoding conversion processing of the compression decoder corresponding to the start of the FF command by the pressing operation of the FF command button, and stops the output from the compression decoder, thereby the control section interrupts the play back of the music, and starts the measurement of the elapsed time from the FF command start. Accordingly, while the play back apparatus conducts the quick traverse play back operation, the play back apparatus becomes a silent condition in which the sound is not played back from the speaker of the play back apparatus.

Further, when the quick traverse play back command is released by the release of the FF command, after the control section calculates the elapsed time from the start of the FF command to the release, the control is conducted in such a manner that the frame position of the data read from the solid state memory is changed to the position preceded by the frame number proportional to the elapsed time, and it is started that the data from the frame position is successively supplied to the buffer memory.

The control section causes to start again the supply of the data from the preceded frame position to the compression decoder, from the data accumulated in the buffer memory, corresponding to the release of the FF command, and the decoding conversion processing of the data from the frame position is started again also for the compression decoder, and the PCM audio data from the frame position is supplied to the D/A converter, and the analog audio signal is generated, and supplied to the amplifier. The amplifier current-amplifies the supplied analog signal, and the mute release of the play back sound is conducted, and the sound is supplied to the speaker. As the result, the play back apparatus can start again the play back of the music from the frame position of the quick traversed data.

[Problems to be Solved]

As described above, while the play back apparatus plays back the music by the compression bit stream data from the solid state memory, and during the quick traverse playback operation from the start of the FF command by the user to the command release, because the play back sound is not played back from the speaker of the playback apparatus, the user can not easily confirm successively what amount of data is quickly traversed by the play back apparatus, by the comparison of the quick traverse sound in the hearing sense. Accordingly, there is a problem that the user has the increased feeling of uneasiness regarding whether the quick traverse play back operation of the apparatus is normally conducted during the quick traverse command.

The above problem occurs also in the case where, for example, while the play back apparatus plays back the music, when the user continues pressing of the quick returning (REW) button provided on the play back apparatus, the quick returning play back command according to the quick returning command (REW command) is conducted.

For such the problem, in the case where the play back apparatus is given the quick traverse play back command (or quick returning play back command), when N multiple speed play back (or N multiple speed reversal play back) whose speed is higher than the ordinary play back speed, is conducted, and when each portion of the play back apparatus is structured so that the play back sound (or reversal play back sound) whose speed is N times higher, is outputted from the speaker, the problem can be solved, however, in that case, it is not only necessary that the control section conducts the control to increase the complicated decoding conversion processing speed of the compression decoder, by making adjustment to increase the synchronous speed of the PCM clock so that the data processing speed in each section of the apparatus is increased, but, it is also necessary that the whole play back circuit of the apparatus is also structured so that the play back speed is stably switched without any trouble, and as the result, because the structure of each section of the apparatus becomes complicated, and the cost is greatly increased, it is not practicable.

In view of the above problems, the present invention is attained, and the object of the present invention is to provide a play back apparatus in which, in the play back apparatus which plays back the audio information by the compression audio information, when the quick traverse play back command (or the quick returning play back command) is given, by playing back the special sound in which the quick traverse play back sound (or the quick returning play back sound) is converted into an imitation sound, the user can easily confirm in the hearing sense that the apparatus is conducting the quick traverse processing (or the quick returning processing) of the data.

SUMARRY OF THE INVENTION

[Means for Solving the Problems]

The invention described in the first aspect is characterized in that: in a play back apparatus in which, according to a play back command from an operation section, the PCM audio data is generated from the compression data in which the audio information is coded, and the audio is played back according to the PCM audio data, the play back apparatus comprises: a control section for conducting the control of each section of the apparatus according to each kind of commands from an operation section; a compression decoder for decode processing the compression data, generating the PCM audio data, and successively outputting it; the first storage section for successively renewing the temporarily stored data successively generated according to the PCM audio data and temporarily storing it, and appropriately repeatedly reading out the temporarily stored data which is temporarily stored, and successively outputting it; and a switching section for selecting either one of the PCM audio data successively outputted from the compression decoder or the temporarily stored data stored in the first storage section, and outputting it, wherein, when a quick traverse play back command or quick returning play back command is given by the operation section, (1) the control section controls the switching section and selectively outputs the temporarily stored data stored in the first storage section and (2) the switch section outputs a special audio data, wherein the special audio data is an imitation sound into which the quick traverse play-back of the audio information is converted.

According to the invention described in the first aspect, while the play back apparatus is conducting an ordinary play back operation of the audio according to the compression data in which the audio information is coded, the control section generates each time the temporarily stored data according to the PCM audio data successively outputted from the compression decoder, and renews and stores it in the first storage section, and when the quick traverse play back command (or quick returning play back command) is given from the operation section, because the control section controls so that the switching section selects the special audio data generated according to the temporarily stored data and outputs it, and conducts the control of the play back operation of the special audio data according to the special audio data, the play back apparatus can play back the special audio according to the special audio data corresponding to the quick traverse play back command or quick returning playback command, instead of the audio at the ordinary play back time. As the result, the user can easily confirm in the hearing sense that the play back apparatus is quick traverse processing (or quick returning processing) the data.

Further, the invention of the second aspect is characterized in that, in the play back apparatus described in the first aspect, the temporarily stored data includes the PCM audio data to play back the special audio data in which the quick traverse play back sound or the quick returning play back sound of the audio information is converted into an imitation sound.

According to the invention described in the second aspect, while the quick traverse play back command (or the quick returning play back command) from the operation section is conducted, because the playback apparatus plays back the special audio in which the quick traverse play back sound (or the quick returning play back sound) is converted into an imitation sound, the user can easily confirm in the hearing sense that the apparatus is quick traverse playing back (or quick returning playing back) the data.

Further, the invention described in the third aspect is characterized in that, in the play back apparatus described in the first aspect, the temporarily stored data includes the data obtained by extracting the PCM audio data outputted from the compression decoder at a predetermined interval.

According to the invention described in the third aspect, while the quick traverse play back command (or the quick returning play back command) from the operation section is conducted, the special audio data is generated according to the temporarily stored data obtained by extracting the PCM audio data outputted from the compression decoder at a predetermined interval, and the special audio according to the special audio data is played back from the play back apparatus. Accordingly, because the user can hear the special audio which hears like that the play back sound according to the audio information is thinned out in the quick traverse direction (or quick returning direction) corresponding to the quick traverse play back command (or, quick returning play back command), the user can easily confirm in the hearing sense that the apparatus is quick traverse playing back (or quick returning playing back) the data.

Further, the invention described in the fourth aspect is characterized in that, in the play back apparatus described in the first to third aspects, the first storage section has a predetermined number of storage addresses, and successively reads in the temporarily stored data successively generated according to the PCM audio data successively generated from the compression decoder, and successively stores it in the address indicated by the control section.

According to the invention described in the fourth aspect, during the ordinary play back operation, the first storage section renews and stores the temporarily stored data successively generated according to the PCM audio data successively generated from the compression decoder in the predetermined number of storage addresses in the arrangement order of the storage addresses indicated by the control section, and when the quick traverse playback command (or quick returning play back command) is given by the operation section, because the first storage section stores and holds the temporarily stored data which is renewed and stored when the command is given, and the stored and held temporarily stored data is repeatedly read out in the arrangement order of the storage addresses indicated by the control section, and successively outputted as the output data, the play back apparatus can play back the special audio according to the audio information close to the audio played back by the ordinary play back operation just before the command, by the special audio data generated according to the output data. As the result, the user can hear the special audio played back when the command is given, without strange feeling, succeeding to the audio played back by the ordinary play back operation just before the command.

Further, the invention described in the fifth aspect is characterized in that, in the play back apparatus described in the first to third aspects, when the quick traverse play back command is given by the operation section, the temporarily stored data stored in the first storage section is repeatedly read out in the stored order, and successively outputted as the output data.

According to the invention described in the fifth aspect, when the play back apparatus is commanded to quick traverse play back, the special audio hearing as if the audio information is thinned out in the quick traverse direction, by the special audio data outputted from the switching section can be played back. Accordingly, when the user hears these special audio, the user can easily confirm in the hearing sense that the apparatus is quick traverse processing the data.

Further, the invention described in the sixth aspect is characterized in that, in the play back apparatus described in the first to third aspects, when the quick traverse play back command is given by the operation section, the temporarily stored data which is temporarily stored, is repeatedly red out in the reversal direction to the stored direction, and successively outputted as the output data.

According to the invention described in the sixth aspect, when the play back apparatus is commanded to quick traverse play back, the apparatus can play back the special audio hearing as if the audio information is thinned out in the quick traverse direction by the special audio data outputted from the switching section. Accordingly, when the user hears the special audio, the user can easily confirm in the hearing sense that the apparatus is quick traverse processing the data.

Further, the invention described in the seventh aspect is characterized in that, in the play back apparatus described in the first to sixth aspects, the control section judges whether the temporarily stored data is already stored in the first storage section, before each kind of command is given from the operation section, and when the temporarily stored data is not yet stored in the first storage section, the control section starts the decoding processing of the compression data by the compression decoder and generates the PCM audio data and successively outputs it from the compression decoder, and controls so that the temporarily stored data generated according to the PCM audio data is temporarily stored in the first storage section.

According to the invention described in the seventh aspect, when the power source of the play back apparatus is turned on in the condition that the temporarily stored data is not stored and held in the first storage section of the play back apparatus, before the control operation corresponding to the play back command, because the control section previously reads out the compression data from, for example, the fixed memory M, and controls so as to generate the temporarily stored data according to a portion of the read out compression data, and the temporarily stored data is stored and held in the first storage section, for example, when the user gives the quick traverse play back command (or quick returning play back command) by the operation section of the play back apparatus whose power source is already turned on, the playback apparatus can quickly play back the special audio by the quick traverse play back command (or quick returning play back command), according to the temporarily stored data stored and held in the first storage section, by the control of the control section. As the result, because, even just after the quick traverse play back command (or quick returning play back command) by the user, the play back sound by the special audio is not intermitted, the user can hear the special audio without any feeling of difference.

Further, the invention described in the eighth aspect is characterized in that, in the play back apparatus described in the first aspect to the seventh aspect, the second storage section for storing the default data including the PCM audio data having a predetermined data amount, is further provided, and the control section judges whether the temporarily stored data is already stored in the first storage section before each kind of command is given from the operation section, and when the control section judges that the temporarily stored data is not yet stored in the first storage section, the control section controls so that the temporarily stored data according to the default data stored in the second storage section is read in the first storage section, and temporarily stored.

According to the invention described in the eighth aspect, because, when the power source of the play back apparatus is turned on under the condition that the temporarily stored data is not stored and held in the first storage section of the play back apparatus, the control section quickly reads out the default data from the second storage section before the control operation corresponding to the play back command, and stores and holds the temporarily stored data according to the read-out default data in the first storage section, for example, even when the user conducts the quick traverse play back command (or quick returning play back command) just after the power source of the play back apparatus is turned on, the play back apparatus can quickly play back the special audio by the quick traverse play back command (or quick returning play back command) according to the temporarily stored data stored and held in the first storage section by the control of the control section. As the result, because even just after the quick traverse play back command (or quick returning play back command) by the user, the play back sound by the special audio is not intermitted, the user can hear the special audio without any feeling of difference.

Further, the invention described in the ninth aspect is characterized in that, in the play back apparatus described in the eighth aspect, the default data includes the PCM audio data to play back the special audio in which the quick traverse play back sound and the quick returning play back sound of the audio information are converted into an imitation sound.

According to the invention described in the ninth aspect, because while the quick traverse play back command (or quick returning play back command) is conducted when the play back apparatus is ordinarily play back-operated, the play back apparatus plays back the special audio in which the quick traverse play back sound (or the quick returning play back sound) of the audio information is converted into an imitation sound by the temporarily stored data generated according to the default data, the user can easily confirm in the hearing sense that the apparatus is quick traverse processing (or quick returning processing).

DETAILED DESCRIPTION OF THE PREFERRED EMBODIMENTS

[Mode for Carrying Out the Invention]

Next, the preferred embodiments of the present invention will be described below on the basis of drawings.

Figure 1:
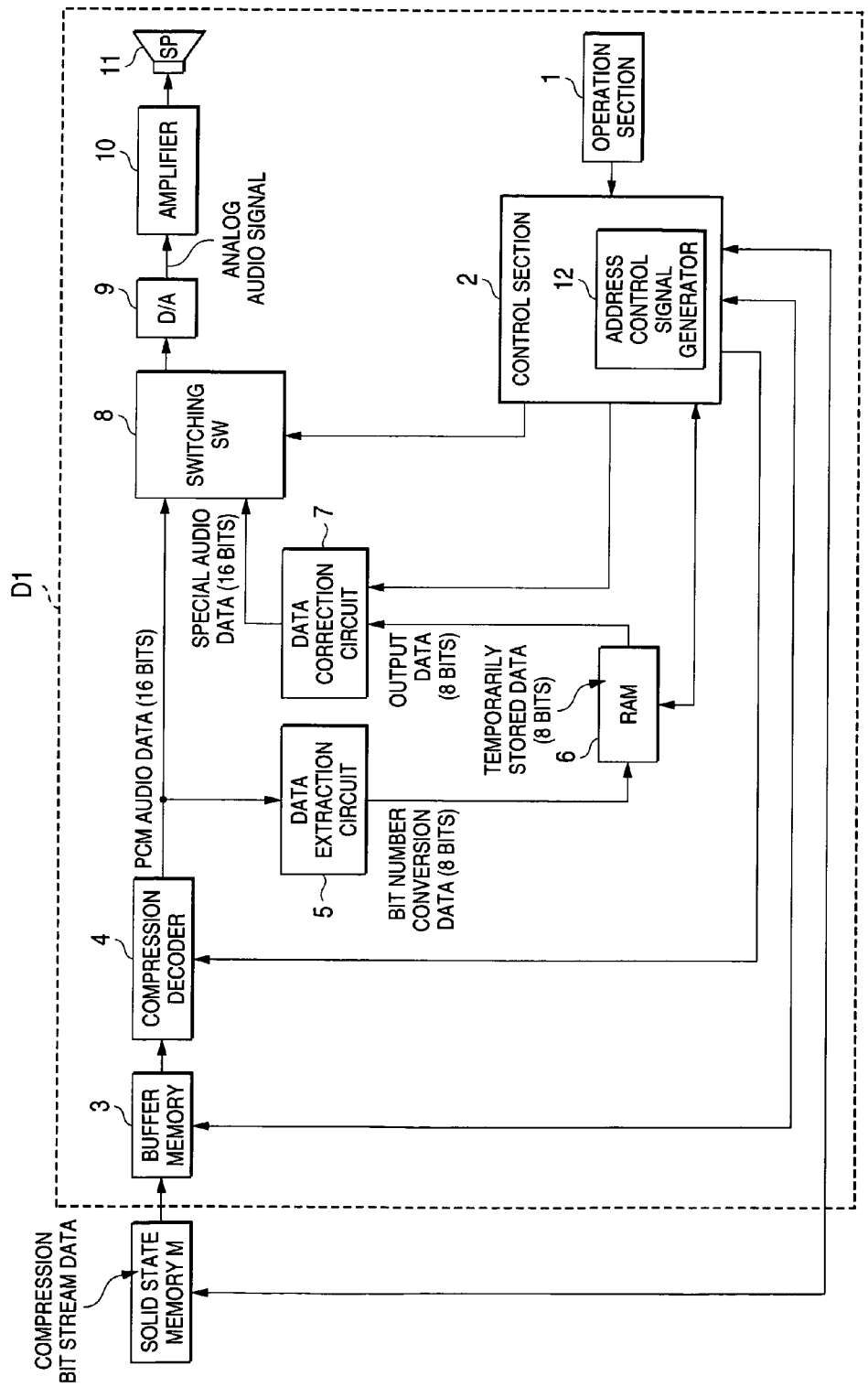
FIG. 1 is an outline block diagram of a play back apparatus D1 in the first embodiment of the present invention.

FIG. 1 is an outline block diagram of a playback apparatus D1 in the first embodiment of the present invention, and herein, the block diagram of the play back apparatus D1 when a solid state memory M as a storage medium is mounted, is shown. In FIG. 1, the play back apparatus D1 comprises an operation section 1, control section 2, buffer memory 3, compression decoder 4, data extraction circuit 5, RAM 6 as the first storage section, data correction circuit 7, switching SW 8, D/A converter 9, amplifier (AMP) 10, and speaker (SP) 11.

Figure 4:
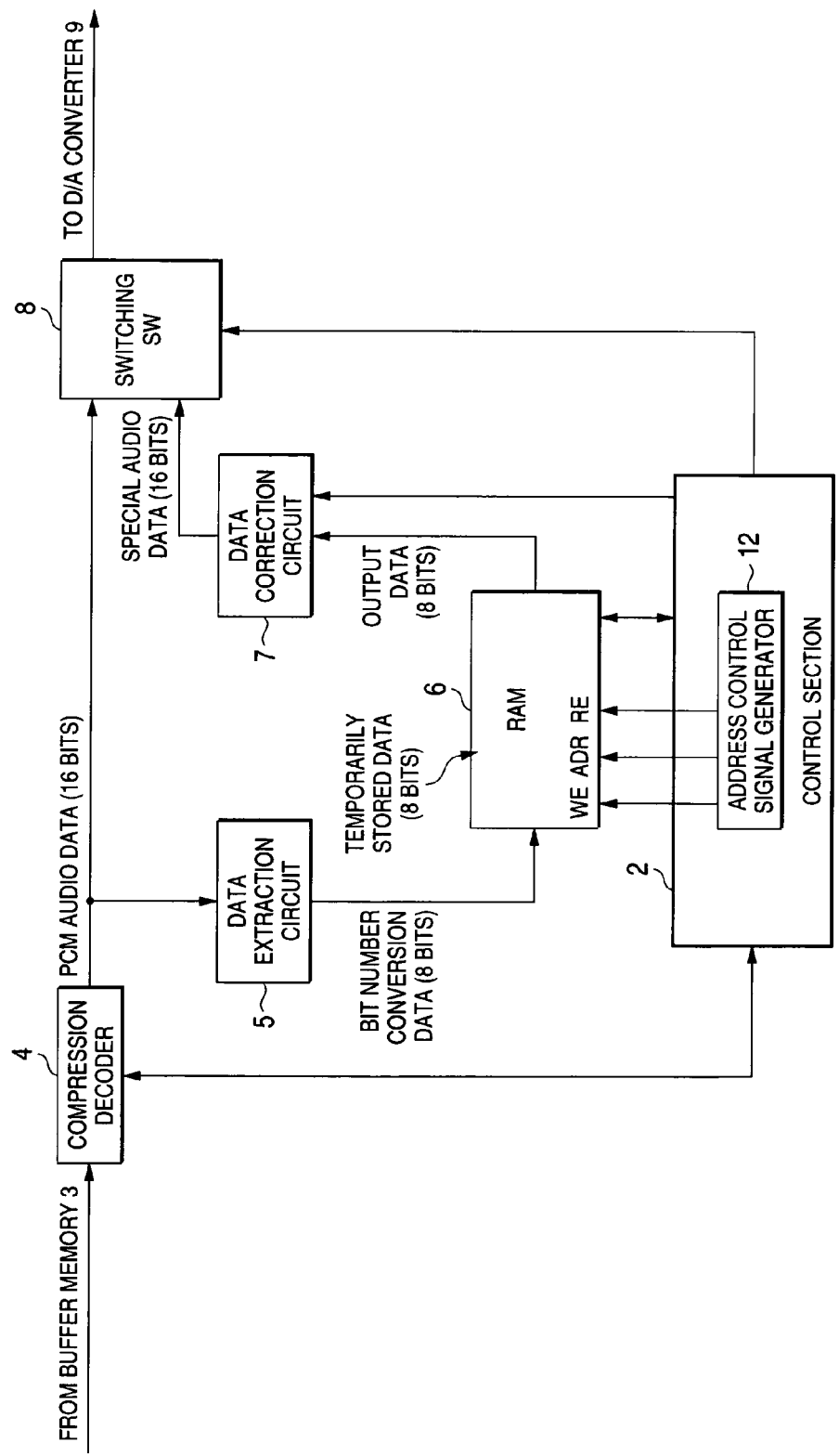
FIG. 4 is a view expressing each of control signals outputted from an address signal generator to the RAM.

Further, in the solid state memory M, herein, the music information for the monaural play back is previously stored and held by the compression bit stream data coded by the MPEG-4 Twin VQ shown in FIG. 4. The solid state memory M is electrically connected to the control section 2 and buffer memory 3 under the condition mounted in the play back apparatus D1, and can successively send the compression bit stream data from the frame position corresponding to the reading-out start position specified by the control section 2 to the buffer memory 3 according to the control command of the control section 2.

The operation section 1 has operation buttons for conducting each kind of commands such as a play back command, stop command, quick traverse (FF) command, quick returning (REW) command, quick traverse play back command, and quick returning play back command, of the play back apparatus D1. When the user operates the operation button of the operation section 1 and its command is appropriately conducted, the operation section 1 sends the command of the effect to the control section 2. The control section 2 controls each portion of the play back apparatus D1 according to these commands from the operation section 1.

By the control of the control section 2 corresponding to the play back command of the operation section 1, the buffer memory 3 temporarily stores the compression bit stream data successively sent from the solid state memory, and then, successively and intermittently supplies the accumulated data to the compression decoder 4 in the continuous predetermined frame number unit. Further, when the control section 2 indicates the read-out start position of the data, the buffer memory 3 successively reads out the data from the frame corresponds to the read-out start position, and successively and intermittently supplies to the compression decoder 4 as described above.

Figure 2:
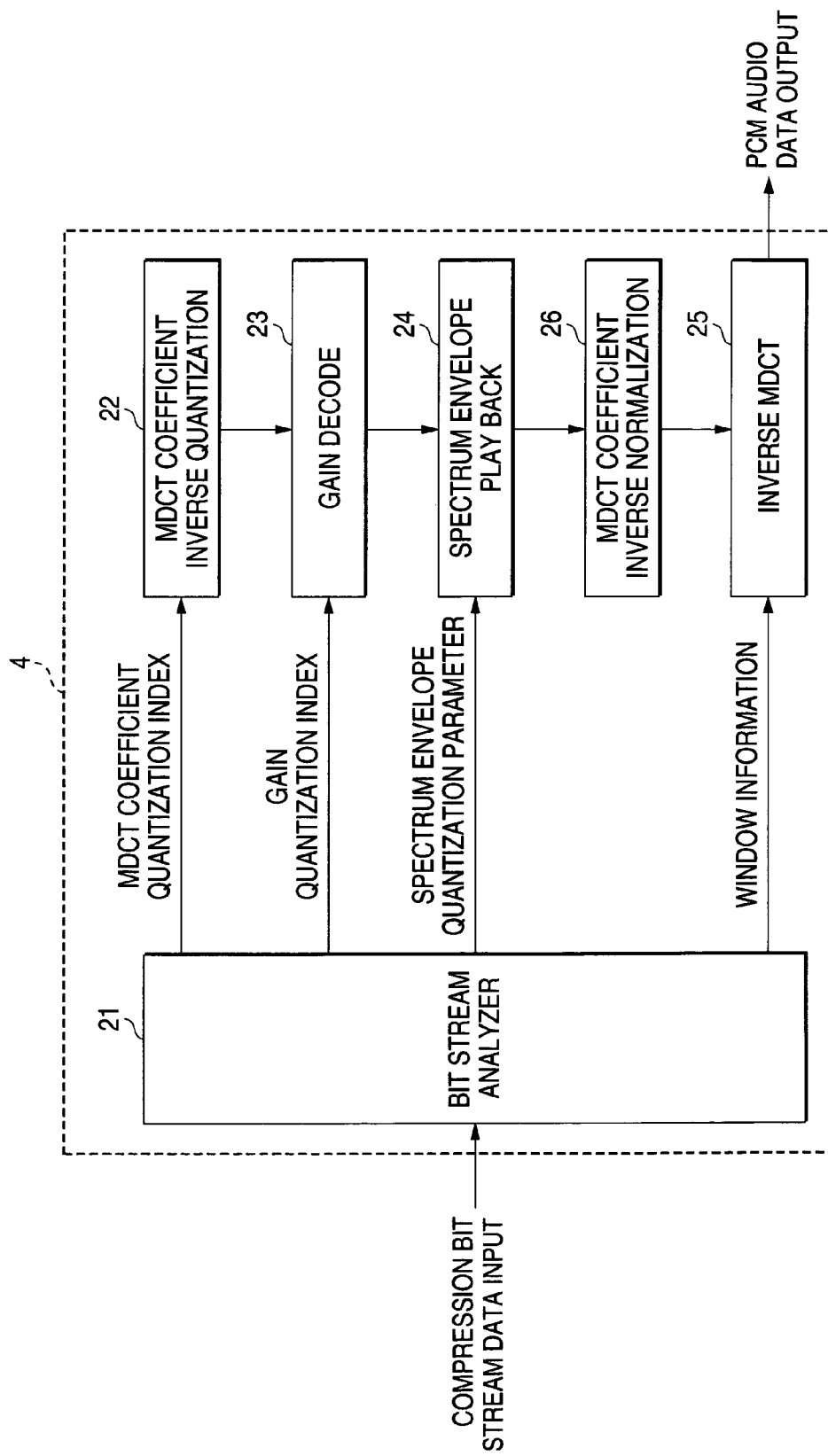
FIG. 2 is an outline block diagram of a compression decoder.

FIG. 2 is an outline block diagram of the compression decoder 4. The compression decoder 4 reads in the successively supplied data from the buffer memory 3 under the control of the control section 2 corresponding to the play back command of the operation section 1, and by the bit stream analyzer 21, calculates the quantization index information of the MDCT coefficient, gain quantization index information, spectrum envelope and gain quantization parameter information, and window information, and respectively supplies to the MDCT coefficient inverse quantization section 22, gain decode section 23, spectrum envelope play back section 24, and inverse MDCT section 25. As the result, in the compression decoder 4, the MDCT coefficient inverse quantization section 22 conducts the inverse quantization processing of the MDCT coefficient by using the quantization index information of the MDCT coefficient on the read-in data for each conversion block, next, the gain decode section 23 conducts the decode processing of the gain by using the gain quantization index information, and next, the spectrum envelope play back section 24 conducts spectrum envelope play back processing by using the spectrum envelope and gain quantization parameter information, and next, after the MDCT coefficient inverse normalization section 26 conducts the inverse normalization of the MDCT coefficient, when the inverse MDCT section 25 conducts inverse MDCT conversion processing by using the window information, the compression bit stream data is decode conversion processed. According to this, the compression decoder 4 generates the non-compressed monaural PCM audio data (PCM audio data) synchronized with the PCM clock of a predetermined frequency generated by the control section 2. The compression decoder 4 successively outputs the generated PCM audio data and supplies to the data extraction circuit 5 and the switching SW 8. In this connection, herein, the PCM audio data outputted from the compression decoder 4 is the digital data including 16 bits.

The data extraction circuit 5 successively extracts the higher rank 8 bits data from the 16 bits PCM audio data successively outputted from the compression decoder 4, and successively supplies this to the RAM 6 as the bit number conversion data. The fact that the data extraction circuit 5 extracts the higher rank 8 bit data from the 16 bit PCM audio data, is for the reason that the RAM address capacity of the RAM 6, which will be described later, that is, the storable data bit number is saved and made to correspond to the 8 bits data.

The RAM 6 as the first storage section has a predetermined number (herein, m) of storing addresses (RAM address).

Figure 3:
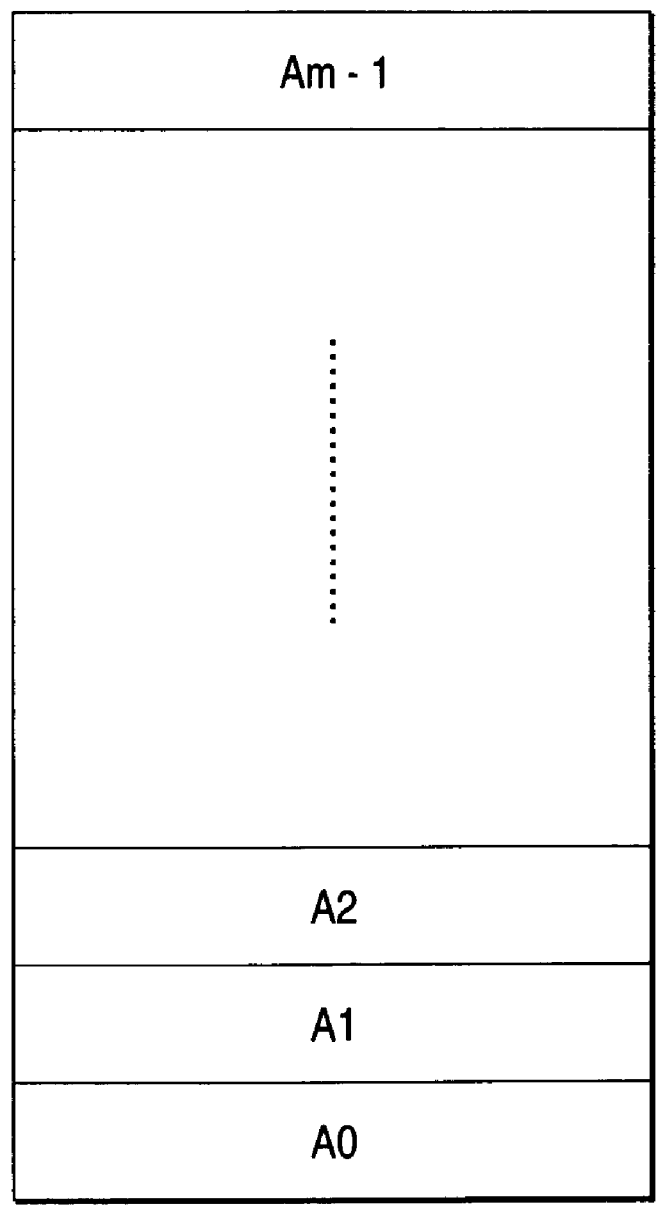
FIG. 3 is a typical view expressing a RAM address space of a RAM.

FIG. 3 is a typical view expressing the RAM address space of the RAM 6. It is supposed that, as shown in the drawing, in the RAM 6, m RAM addresses (A0–Am−1) in which 8 bit data can be respectively stored, are provided in the arrangement order as shown in FIG. 3.

The RAM 6 extracts the data of a predetermined frame unit by successively thinning out it at a predetermined synchronous interval from the bit number conversion data successively supplied from the data extraction circuit 5, by the control of the control section 2 corresponding to the play back command of the operation section 1, and by successively renewing it in the arrangement order of A0–Am−1 in the m RAM addresses shown in FIG. 3, and by repeatedly overwriting it, the temporarily stored data always including m partitioned data of 8 bits is renewed and stored. The temporarily stored data is the data to generate the special audio, which will be described later, which is played back corresponding to respective of the quick reverse play back command and quick returning play back command, for example, for 5 seconds.

Further, the RAM 6 can repeatedly readout the temporarily stored data in the order of RAM address indicated by the control section 2 and successively supply to the data correction circuit 7 as the output data, by the control of the control section 2 corresponding to the quick traverse play back command (or quick returning play back command) from the operation section 1.

By the control of the control section 2 corresponding to the quick traverse play back command (or quick returning play back command) from the operation section 1, the data correction circuit 7 successively generates the special audio data including 16 bit configuration continuous PCM audio data, by respectively adding the lower 8 bits 0 data to the data for each RAM address of the temporarily stored data of 8 bit configuration continuously and repeatedly supplied from the RAM 6, and supplies it to the switching SW 8.

The data writing operation by which the temporarily stored data is generated according to the bit conversion data outputted from the data extraction circuit 5 and renewed and stored in the RAM 6, and the data reading out operation by which the temporarily stored data stored and held by the RAM 6 is supplied to the data correction circuit 7, are conducted according to each control signal outputted from an address control signal generator 12 possessed by the control section 2.

FIG. 4 is a view showing each control signal outputted from the address signal generator 12 to the RAM 6. From the address signal generator 12, the address signal (ADR signal), write enable signal (WE signal) and read enable signal (RE signal) are outputted as the control signal.

The ADR signal is a control signal to indicate the RAM address of the RAM 6. The WE signal is the control signal to write the temporarily stored data in the RAM address indicated by the ADR signal. The RE signal is the control signal to output the temporarily stored data already written in the RAM address indicated by the ADR signal from the RAM 6, and to supply it to the data correction circuit 7.

Each of these control signals is outputted in timed relationship with the PCM clock of a predetermined frequency generated by the control section 2. In this connection, the ADR signal is, as will be described later, outputted so as to indicate each of RAM addresses of the RAM 6 at the timing corresponding to respective cases at the time of the data writing-in operation and data reading-out operation.

When the control section 2 outputs the ADR signal at the time of the data writing-in operation and the WE signal from the address control signal generator 12 corresponding to the playback command from the operation section 1, the temporarily stored data according to the bit number conversion data outputted from the data extraction circuit 5 is generated, and can be renewed and stored in the RAM 6.

Figure 5:
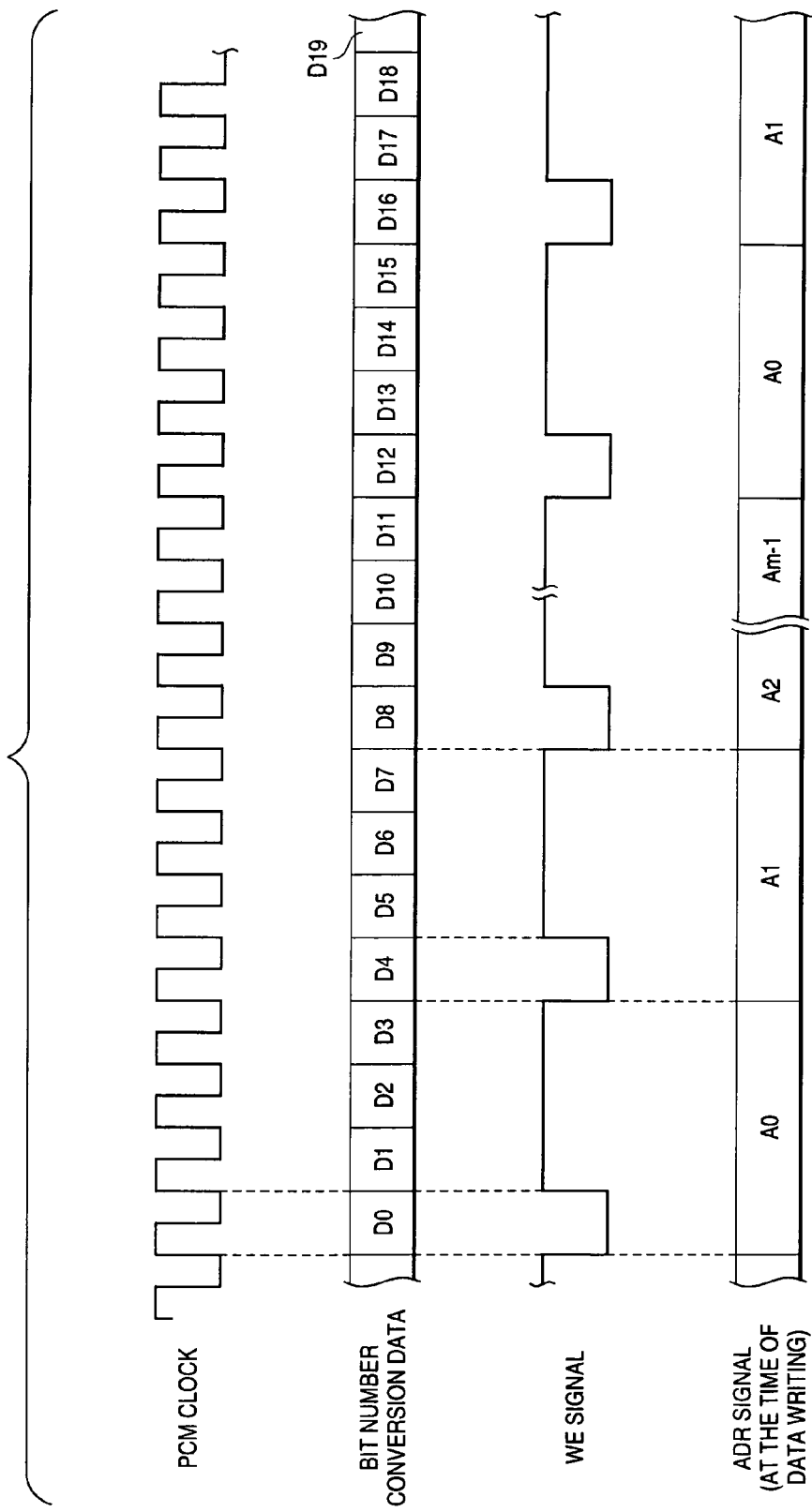
FIG. 5 is a wave form view in which, in the data writing operation of the RAM, each of wave forms of the bit number conversion data, WE signal, and ADR signal inputted into the RAM, is made to be in timed relationship with a PCM clock wave form of a control section, and shown.

FIG. 5 is a waveform view, in which each of waveforms of the bit number conversion data, WE signal and ADR signal, inputted into the RAM 6 at the time of the data writing-in operation of the RAM 6, is made to be in timed relationship with the PCM clock waveform of the control section 2, and shown.

As shown in FIG. 5, the PCM clock includes continuous rectangular pulses of a predetermined frequency (for example, 48 kHz). Further, the bit conversion data is a 8-bit continuous data generated according to the 16-bit PCM audio data successively outputted from the compression decoder 4 as described above, and the partitioned data Dn (=D0, D1, D2, D3, . . . )in timed relationship with a predetermined clock period of the PCM clock is generated continuously in the time direction.

The WE signal is a pulse signal to thin out and extract the partitioned data of the bit number conversion data at a predetermined interval, and in the present embodiment, the WE signal, as shown in FIG. 5, thins out and extracts the partitioned data at a ratio of 4 to 1 from the bit number conversion data, when the gate pulse having the width corresponding to the 1 partitioned data interval is generated at the ratio of 1 time to the 4 continuous partitioned data.

The ADR signal at the time of data writing-in operation is the control signal to successively indicate the RAM address of the RAM 6 in timed relationship with each gate pulse of the WE signal, in the order of the arrangement from A0 to Am−1.

When the play back command is given from the operation section 1, the control section 2 outputs the WE signal and ADR signal, which are in timed relationship with the PCM clock, from the address control signal generator 12 to the RAM 6 at the timing shown in FIG. 5, and the partitioned data is successively thinned out and extracted from the bit number conversion data for each predetermined time, at the ratio of 1 to 4.

Further, the extracted each partitioned data is respectively written in the RAM address indicated by the ADR signal. As the result, in m RAM addresses (A0, A1, A2, . . . Am−1) of the RAM 6, the respectively corresponding m partitioned data (D0, D1, D2, . . . , Dm−1) are successively written, and succeeding to that, the partitioned data Dm is overwritten in the RAM address A0, and next, the partitioned data Dm+1 is overwritten in the EAM address A1, and hereinafter, in the same manner, the newly extracted partitioned data is successively overwritten in each RAM address. By repeating this, the RAM 6 always renews and holds the temporarily stored data including m 8-bit partitioned data.

Further, when the control section 2 outputs the RE signal from the address control signal generator 12 corresponding to any of the commands of the quick traverse play back command or quick returning play back command from the operation section 1, and the ADR signal corresponding to the command to the RAM 6, the control section 2 repeatedly reads out the temporarily stored data stored and held by the RAM 6 at the time, and can makes the RAM 6 output the output data corresponding to the command, and continuously supply it to the data correction circuit 7.

Figure 6:
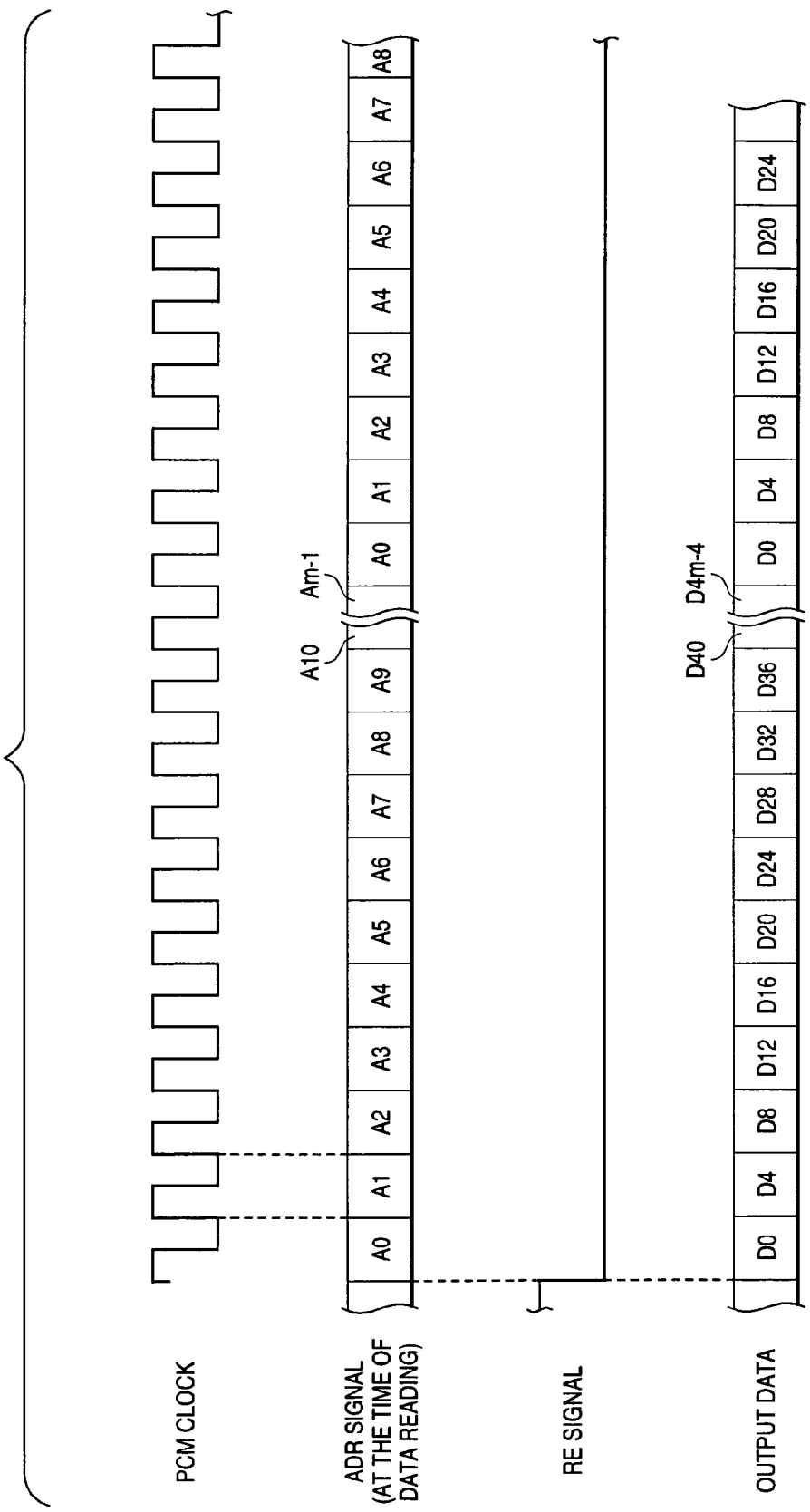
FIG. 6 is a wave form view in which, when the quick traverse play back command is given, each of wave forms of the RE signal and ADR signal outputted from the address control signal generator, and the output data outputted from the RAM, is made to be in timed relationship with a PCM clock wave form of a control section, and shown.

FIG. 6 is a wave form view shown in the condition in which each of wave forms of the RE signal outputted from the address control signal generator 12 when the quick traverse play back command is given from the operation section 1, and the ADR signal at the time of the data read out operation when the quick traverse play back command is given, and the output data outputted from the RAM 6 by the data read out operation corresponding to the quick traverse play back command, is made to be in timed relationship with the PCM clock wave form of the control section 2.

As shown in FIG. 6, the ADR signal at the time of the data read out operation outputted from the operation section 1 is a control signal for successively indicating the RAM address, corresponding to each of partitioned data of the temporarily stored data including m partitioned data being stored and held in each of RAM addresses of the RAM 6 in timed relationship with the clock period of the PCM clock, in the arrangement order from A0 to Am−1.

Further, the RE signal is a control signal given for the purpose in which the RAM 6 reads out the temporarily stored data being stored and held in the RAM 6 from the leading position of the partitioned data.

When the quick traverse play back command is given by the operation section 1, the control section 2 stores and holds the temporarily stored data including m 8-bit partitioned data which is renewed and stored in the RAM address (A0~Am−1) of the RAM 6 at the time, and outputs the ADR signal at the time of the data reading out when the RE signal and the quick traverse play back command are given from the address control signal generator 12 at the timing shown in FIG. 6 to the RAM 6, and conducts the control to successively read out the partitioned data from the RAM address successively indicated by the ADR signal.

Thereby, m partitioned data (D0, D4, D8, . . . , D4m−4) stored and held in each of RAM addresses of the RAM 6 are successively outputted as the repeating output data in the order of the RAM address indicated by the ADR signal.

Figure 7:
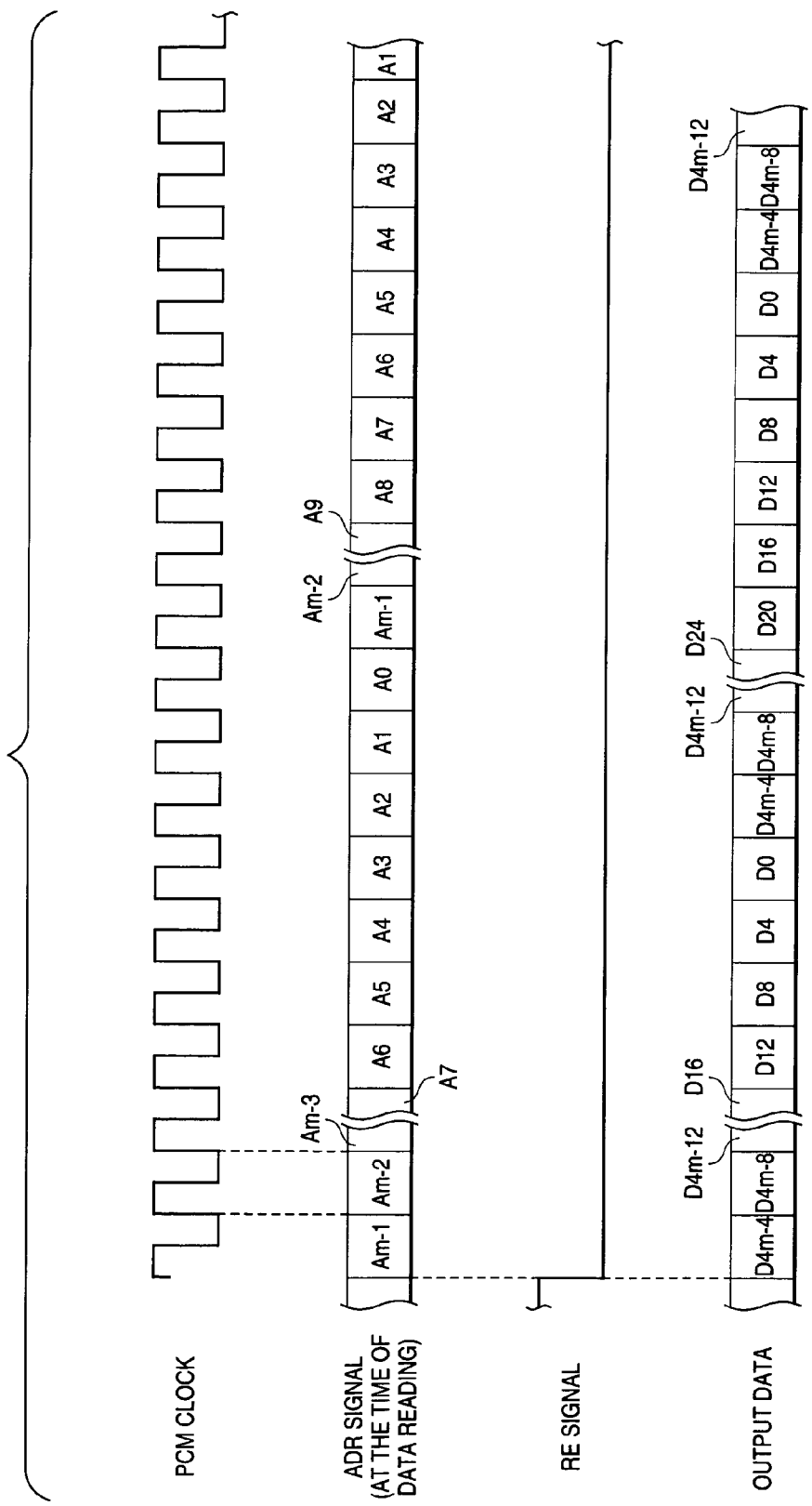
FIG. 7 is a wave form view in which, when the quick returning play back command is given, each of wave forms of the RE signal and ADR signal outputted from the address control signal generator, and the output data outputted from the RAM, is made to be in timed relationship with the PCM clock wave form of the control section 2, and shown.

Further, FIG. 7 is a wave form view shown in the condition in which each of wave forms of the RE signal outputted from the address control signal generator 12 when the quick returning play back command is given from the operation section 1, and the ADR signal at the time of the data read out operation when the quick returning play back command is given, and the output data outputted from the RAM 6 by the data read out operation corresponding to the quick returning play back command, is made to be in timed relationship with the PCM clock wave form of the control section 2.

As shown in FIG. 7, the ADR signal when the quick returning play back command is given from the operation section 1, is a control signal to successively indicate the RAM address in the reversal order of RAM address to the each of RAM address order indicated by the ADR signal when the quick traverse play back command is given, shown in FIG. 6, that is, in the arrangement order from Am−1 to A0.

When the quick returning play back command is given from the operation section 1, the control section 2 outputs the same RE signal as in the case where the quick returning play back command is given from the address control signal generator 12 corresponding to the command, and outputs the ADR signal at the time of the data read out operation when the quick returning play back command is given at the timing shown in FIG. 7 to the RAM 6, and conducts the control to successively read out the partitioned data from the RAM address successively indicated by the ADR signal.

Thereby, m partitioned data (D4m−4, D4m−8, D4m−12, . . . D0) stored and held in each of RAM addresses of the RAM 6 are successively outputted as the repeating output data in the order of the RAM address indicated by the ADR signal, that is, in the order from Am−1 toward A0.

Further, as shown in FIG. 1, the switching SW8 appropriately switches in an alternative way, the PCM audio data supplied from the compression decoder 4 and the special audio data supplied from the data correction circuit 7 by the control of the control section 2, and supplies it to the D/A converter 9. When the PCM audio data is selected and supplied by the switching SW 8, the D/A converter 9 D/A converts the PCM audio data, and generates the analog audio signal by the PCM audio data, and supplies it to the amplifier 10. Further, when the special audio data is selected and supplied by the switching SW 8, the special audio data is D/A converted, and the analog audio signal by the special audio data is generated and supplied to the amplifier 10.

The amplifier 10 amplifies these analog audio signal supplied from the D/A converter 9 and supplies to a speaker 11 as a sound releasing section. As the result, the music or special sound corresponding to the analog audio signal is played back from the speaker 11.

The play back apparatus D1 is generally structured as described above, and when the play back command is given from the operation section 1 equipped with the solid state memory, the control section 2 supplies the compression bit stream data from the solid state memory M corresponding to the command successively from the frame of the leading position to the buffer memory 3. The buffer memory 3 successively supplies the supplied data to the compression decoder 4 in a predetermined frame unit.

As the result, the PCM audio data is successively outputted respectively from the compression decoder 4 to the switching SW 8 and the data extraction circuit 5 simultaneously. Then, because the control section 2 switches the input of the switching SW 8 corresponding to the play back command from the operation section 1 to the output side of the compression decoder 4 and selects it, and conducts the control to output the PCM audio data outputted from the compression decoder 4 to the D/A converter 9, the music according to the PCM audio data is successively played back from the speaker 11.

In this connection, because the data extraction circuit 5 generates the bit number conversion data according to the supplied PCM audio data, and successively supplies it to the RAM 6, when the control section 2 outputs the WE signal and ADR signal at the time of the data writing operation, from the address control signal generator 12 to the RAM 6 corresponding to the play back command, in addition to the control operation, the control section 2 renews and stores the temporarily stored data into the RAM 6.

Figure 8:
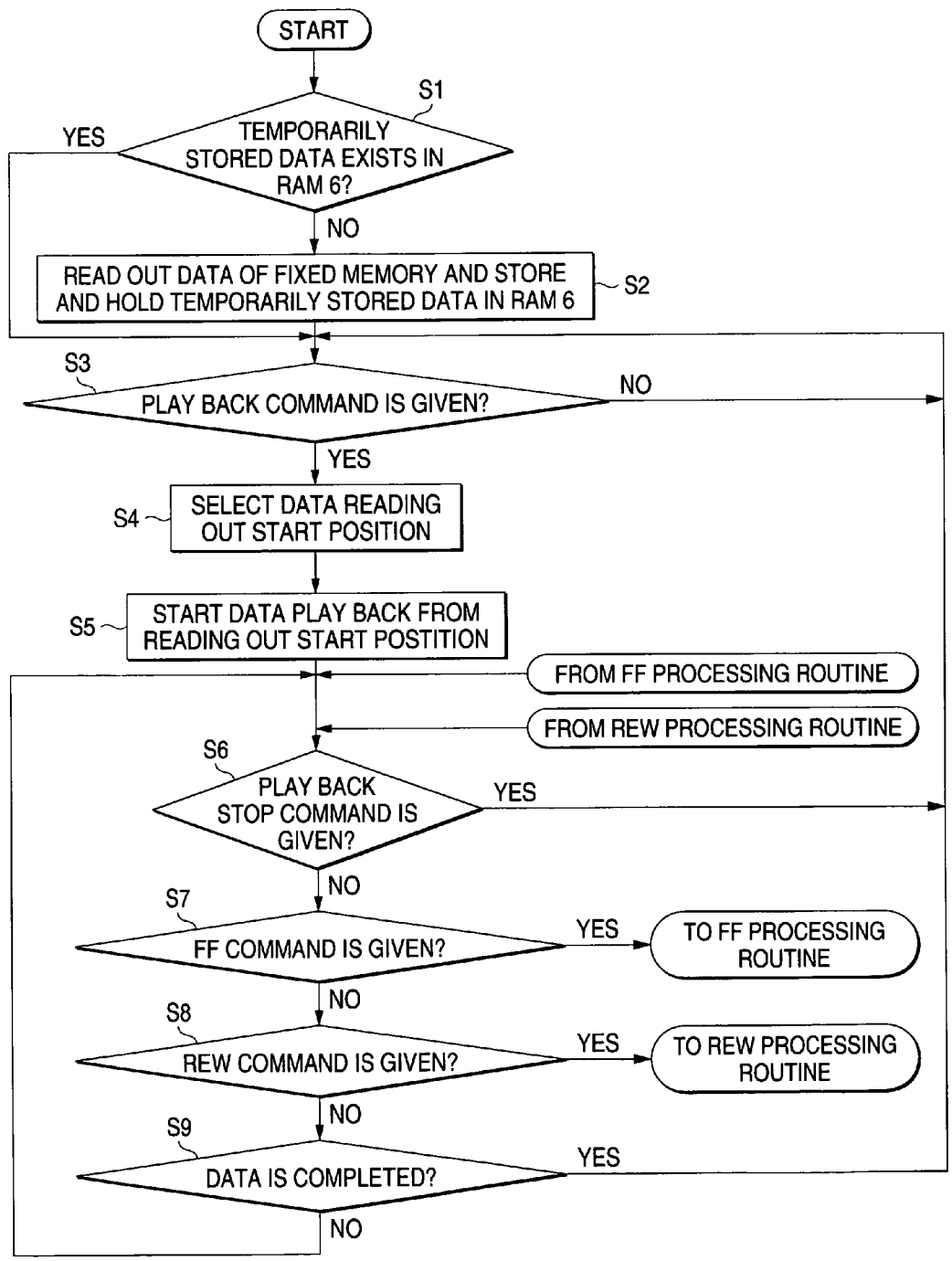
FIG. 8 is a view showing a flow chart of the play back control operation of the control section according to each kind of command from an operation section of a play back apparatus D1.

FIG. 8 is a view showing a flow chart of the play back control operation of the control section 2 according to each kind of commands from the operation section 1 of the play back apparatus D1.

In FIG. 8, initially, when the power source of the play back apparatus D1 is turned ON, the control section 2 starts (START) the control of each section, and advances to step S1, and judges whether the temporarily stored data exists in RAM 6, that is, the temporarily stored data is stored and held in the RAM 6. The control section 2 advances to step S2 when the temporarily stored data does not exist in the RAM 6 in step S1.

The case where the temporarily stored data does not exist in the RAM 6 in the play back apparatus D1, means a case where the compression bit stream data from the solid state memory M is not supplied to the display apparatus D1 once, and accordingly, because the bit number conversion data is not yet supplied from the data extraction circuit 5 to the RAM 6, the temporarily stored data is not renewed and stored in the RAM 6, or the temporarily stored data is not stored and held in the RAM 6, and for example, the case where the play back apparatus D1 is delivered as a product and the power source is not yet turned ON, corresponds to it.

In step S2, the control section 2 conducts the control operation to read out the compression bit stream data from the solid state memory M equipped in the play back apparatus D1, and successively supplies the read out data in the buffer memory 3 and accumulates it in the buffer memory 3 once, and then supplies a portion of the accumulated data to the compression decoder 4 in a continuous predetermined frame unit, and conducts the decode conversion processing by the compression decoder 4, and successively outputs the PCM audio data from the compression decoder 4. The PCM audio data is supplied to the data extraction circuit 5 and the bit number conversion data according to the data extraction circuit 5 is generated by the data extraction circuit 5. Then, the bit number conversion data is supplied to the RAM 6.

Then, when the control section 2 supplies the WE signal and the ADR signal at the time of the data writing in operation from the address control signal generator 12 to the RAM 6, the control section 2 generates the temporarily stored data according to the bit number conversion data successively sent from the data extraction circuit 5 to the RAM 6, and after the control section 2 stores and holds it in the RAM 6, the control section 2 stops the WE signal and the ADR signal from the address control signal generator 12, and advances to step S3.

This is for the reason that, when the power source of the apparatus is turned ON under the condition that the temporarily stored data is not stored and held in the RAM 6, and after a while, for example, the play back command and the FF command are given at almost the same time, and thereby, the quick traverse play back is conducted, the control section 2 previously stores and holds the temporarily stored data in the RAM 6 before these commands so that the control section 2 can play back the special audio by the FF command at once.

Further, when the temporarily stored data exists in the RAM 6 in step S1, the control section 2 advances to step S3.

The case where the temporarily stored data exists in the RAM 6 in the play back apparatus D1, corresponds to the case where, for example, the play back apparatus D1 has conducted the play back of the audio information before the operation of step S1 of the control section 2, and at the time, the play back apparatus D1 stores and holds the temporarily stored data in the RAM 6.

In this connection, in the play back apparatus D1, when the temporarily stored data is being renewed and stored in the RAM 6, or the temporarily stored data is stored and held, or after when the play back operation is stopped by the play back stop command, even when the power source of the play back apparatus D1 is turned OFF, the RAM 6 can store and hold the temporarily stored data just before the power source of the apparatus is turned OFF, by using the back up power source.

In step S3, the control section 2 judges whether the play back command is given from the operation section 1, and when the play back command is given, the sequence advances to step S4, the control section 2 starts the control operation to select the reading out position of the compression bit stream data according to the play back commands from the operation section 1. Specifically, in the case where, for example, the music information is stored in the solid state memory M, when the ordinary play back command to play back the music information from the first musical composition is given in step S3, the control section 2 advances to the step S4, and starts the control operation to select the data frame position corresponding to the leading position of the first musical composition as the reading out start position of the data of the solid state memory M. Further, in step S3, when the play back command of the program of the musical composition PG1 of each of musical compositions is given, the control section 2 advances to step S4, and starts the control operation to select the data frame position corresponding to the leading position of the musical composition PG1 as the reading out start position of the data of the solid state memory M.

As described above, after the time when, in step S4, the control section 2 starts the control operation to select the reading out position of the data corresponding to the ordinary play back command of the music information or the program play back command, the control section 2 advances to the next step S5, and controls to successively supply the data from the selected reading out start position to the buffer memory 3, and conducts the play back control operation of the music from the reading out start position of the selected data.

In this connection, because the control section 2 also conducts the writing-in control operation of the temporarily stored data into the RAM 6 in parallel during the play back control operation at the time of the play back command and the program play back command, the RAM 6 successively conducts the renewing and storing of the temporarily stored data stored and held up to that time.

The control section 2 advances to step S6 following the control operation in step S5, and judges whether the play back stop command is given from the operation section 1, and when the play back stop command is given, the control section 2 returns to the preceding step S3, and is in the reception condition of the next play back command from the operation section 1, and when the play back command is given in the step S3, the control section 2 conducts again the subsequent control operation.

Further, in step S6, when the play back stop command is not given from the operation section 1, the control section 2 advances to step S7, consecutively conducting the play back operation in step S5.

In step S7, the control section 2 judges whether the FF command is given from the operation section 1, and when the FF command is given, the control section 2 judges that the quick traverse play back command is given, and conducts the control operation of the control section 2 in the FF processing routine, which will be described later. Further, in step S5, when the FF command is not given, the control section 2 advances to step S8, consecutively conducting the play back operation in step S5.

In step S8, the control section judges whether the REW command is given from the operation section 1, and when the REW command is given, the control section 2 judges that the quick returning play back command is given, and conducts the control operation of the control section 2 in the REW processing routine, which will be described latter. Further, in step S9, when the REW command is not given, the control section 2 advances to step S9, consecutively conducting the play back operation in step S5.

In this connection, in the step S6 and step S7, after the control section 2 respectively conducts the FF processing routine and the REW processing routine, which will be described later, and the corresponding processing routine is completed, the control section 2 returns again to step S6, and conducts the subsequent control operation.

In step S9, the control section 2 judges whether the play back of the data is completed, from a remaining amount of the data supplied from the solid state memory M to the buffer memory 3 in the buffer memory 3, and when the play back of the data is not completed, that is, when the data to be played back exists in the buffer memory 3, the control section 2 returns again to the preceding step S3, and is in the reception condition of the new play back command from the operation section 1, and when the control section 2 corresponds to the new play back command, the control section 2 conducts again the subsequent control operation.

Further, in step S9, when the play back of the data is completed, that is, when the data to be played back does not exist in the buffer memory 3, after the control section 2 stores and holds the temporarily stored data which is renewing and storing in the RAM 6, into the RAM 6, the control section 2 stops the WE signal from the address control signal generator 12 and the ADR signal at the time of the data writing-in operation, and after that, returns to the preceding step S3, and is in the reception condition of the play back command from the operation section 1.

Next, the quick traverse playback operation and the quick returning play back operation of the play back apparatus D1 according to the FF command and REW command will be described below.

Initially, the quick traverse play back operation of the play back apparatus D1 according to the FF command will be described. While the play back apparatus D1 is playing back the music as described above, for example, when the user continues to press the quick traverse (FF) button provided in the operation section 1 and the FF command is given, the control section 2 judges that the quick traverse play back command is given, and when, corresponding to the start of the FF command, the control section 2 interrupts the decode conversion processing of the compression decoder 4 and stops the output from the compression decoder 4, the play back of the music is interrupted, and the measurement of the elapsed time from the FF command start is started.

Further, when the control section 2 outputs the WE signal and the ADR signal at the time of the data reading out operation corresponding to the FF command from the address control signal generator 12 to the RAM 6 corresponding to the FF command, the control section 2 stops the renewal and storing operation of the temporarily stored data to the RAM 6, and controls in such a manner that the control section 2 repeatedly reads out the temporarily stored data in the order of RAM address indicated by the control section 2 and successively outputs it as the output data corresponding to the FF command and supplies it to the data correction circuit 7.

As the result, the data correction circuit 7 generates the special audio data corresponding to the quick traverse play back command from the supplied output data, and supplies it to the switching SW 8. Further, by the control of the control section 2 according to the FF command of the operation section 1, the switching SW 8 selects the special audio data successively supplied from the data correction circuit 7 and outputs to the D/A converter 9. As the result, from the speaker 11, the special audio by the special audio data in which the quick traverse play back sound of the audio information is converted into an imitation sound, is successively played back. The special audio corresponds to, for example, so-called a squeaky sound played back when the music information by the analog audio signal recorded on the magnetic tape is quick traverse played back.

Next, in the case where the play back apparatus D1 is conducting the quick traverse play back operation during the FF command, when the user stops the pressing on the quick traverse (FF) button and thereby the FF command is released, the control section 2 judges that the quick traverse play back command is released, and calculates the time T1 from the FF command start to the FF command release, and when the reading-out start position X1 of the quickly traversed data by the FF command is calculated according to the time T1, and the control section 2 conducts the control to indicate again the frame position of the data read from the solid state memory M to the reading-out start position X1.

Herein, when a method for the control section 2 to calculate the reading-out position X1 of the data at the time of the FF command release, will be described, then, initially, the control section 2 calculates the time T1 from the FF command start to the FF command release, measured up to that time at the time of the FF command release, and by using the time T1, the reading-out position X1 of the data is calculated by the following relational expression (1).

$$X1 = L1 \cdot T1 \cdot S1 + Z1 \qquad (1)$$

In the above expression (1), L1 is a variable proportional to an average data transmission rate at the time T1 of the compression bit stream data successively supplied from the buffer memory 3 to the compression decoder 4 at the time of the ordinary play back operation of the play back apparatus D1, and herein, it is expressed by the average frame number supplied per unit time.

Further, S1 is a quick traverse speed rate showing at what speed the data is quick traversed by the FF command, and this is reversely proportional to the ratio in which the partitioned data is thinned out from the bit number conversion data outputted from the data extraction circuit 5 by the WE signal outputted from the address control signal generator 12. Accordingly, as in the present embodiment, when the partitioned data is thinned out from the bit number conversion data at the ratio of 4:1 by the WE signal, S1=4. Further, Z1 expresses the frame number (N) of the reading-out leading position of the compression bit stream data from the buffer memory 3 at the time of FF command.

As can be seen from the above expression (1), the reading-out position X1 of the data expresses the frame number corresponding to the number in which the frame number of the data quick traversed during the time from the FF command start to the FF command release is added to the frame number at the time of the FF command start, and when the control section 2 indicates the reading-out of the data from the frame position corresponding to the reading-out position X1 of this data, to the solid state memory M and the buffer memory 3, the frame position of the data to be played back after the quick traverse play back command release, that is, herein, after the FF command release, can be indicated.

Specifically, the control section 2 generates the discrimination data of the frame corresponding to the frame number from the frame number expressed by the reading-out start position X1, and conducts the reading-out of the data from the frame position having the discrimination data, to the solid state memory M and buffer memory 3 and indicates.

The control section 2, succeeding to the control operation, conducts the control to read out again the data of the solid state memory M from the frame position corresponding to the reading-out start position X1 and successively send the data to the buffer memory 3, and also to the buffer memory 3, conducts the control to read out again the data from the frame position corresponding to the reading-out start position X1 and successively send the data to the compression decoder 4.

Further, in this case, when the control section 2 switches the switching SW 8 to the output side of the compression decoder 4 corresponding to the FF command release, the control section 2 controls to play back the PCM audio data from the frame position corresponding to the reading-out start position X1 outputted from the compression decoder 4.

Thereby, when the FF command is released, the play back apparatus D1 switches again the special audio played back while the quick traverse play back command is given, to the audio by the audio information from the frame position corresponding to the reading-out start position X1 of the quick traversed data, and can play back it.

Figure 9:
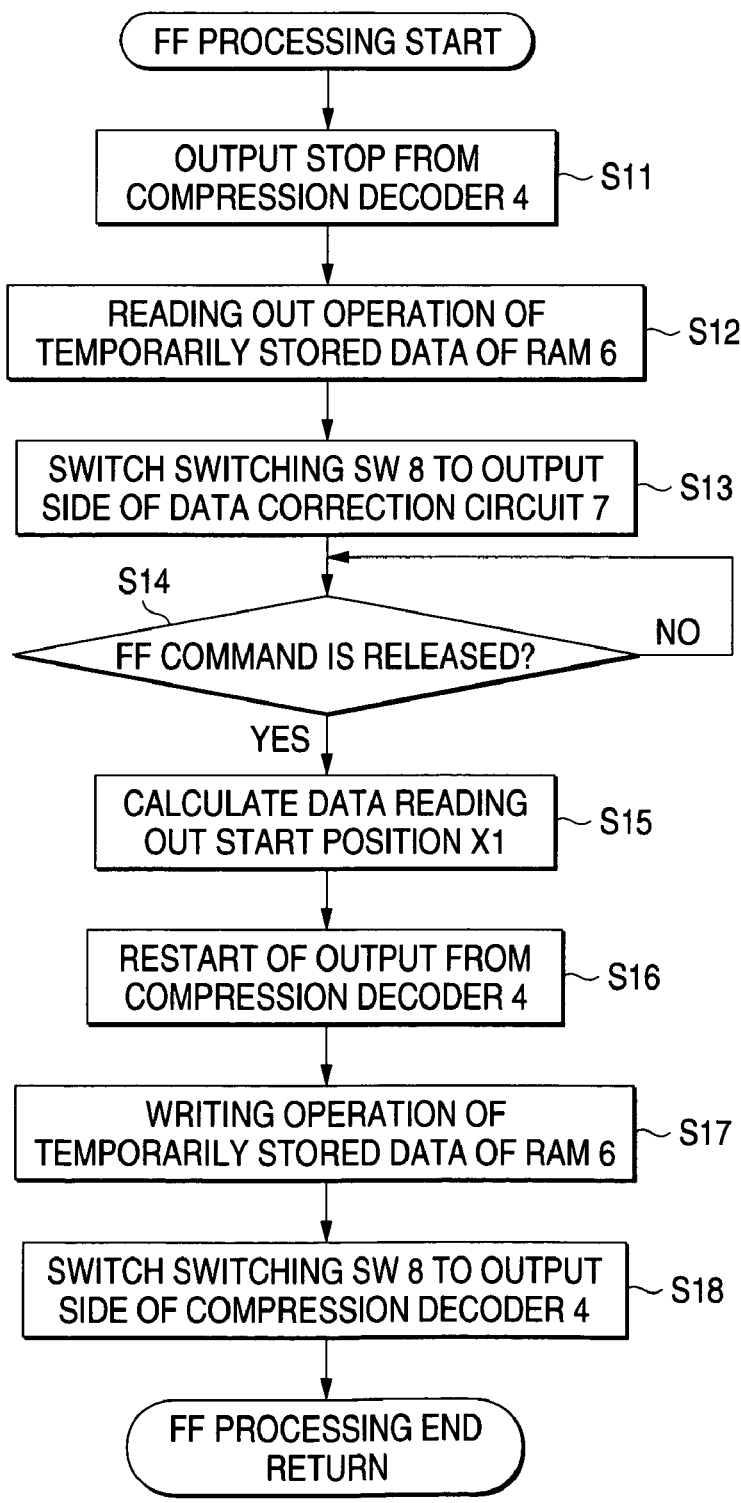
FIG. 9 is a view showing an operation flow chart of the control section in an FF processing routine.

FIG. 9 is a view showing a operation flow chart of the control section 2 in the FF processing routine. When this is described succeeding to the operation of step S7 shown in F8, initially, when the FF command is given in step S7 shown in FIG. 8, the control section 2 starts (START) the control operation of the FF processing routine shown in FIG. 9, and advances to step S11.

In step S11, the control section 2 interrupts the decode conversion processing of the compression decoder 4, and interrupts the play back of the music from the speaker 11 by stopping the output from the compression decoder 4, and starts the measurement of the elapsed time from the FF command start, and stops the WE signal from the address control signal generator 12 and the ADR signal at the data writing operation, and then, advances to step S12.

In step S12, when the control section 2 outputs the RE signal from the address control signal generator 12 to RAM 6 and the ADR signal at the time of the data reading out, the control section 2 controls in such a manner that the RAM 6 repeatedly outputs successively the temporarily stored data including m 8-bit data stored and held in m RAM addresses in step S11, in the order of the RAM addresses from A0 toward Am−1 and conducts the data reading out operation, and conducts the control operation to supply the output data to the data correction circuit 7, and after it controls in such a manner that the data correction circuit 7 generates the special audio data according to the output data and outputs to the switching SW 8, the control section 2 advances to step 13.

Next, in step S13, when the control section 2 switches the input of the switching SW 8 to the output side of the data correction circuit 7, the control section 2 controls in such a manner that the switching SW 8 selects the special audio data outputted from the data correction circuit 7 and successively outputs it, and the playback apparatus D1 plays back the special audio by the special audio data, and after that, the control section 2 advances to step S14. Thereby, from the speaker 11 of the play back apparatus D1, the special audio in which the quick traverse play back sound is converted into an imitation sound, is successively repeatedly played back.

Next, the control section 2 is in a release waiting condition of the FF command in step S14, and when the FF command is released, the control section 2 judges that the quick traverse play back command is released, and advances to step S15.

In step S15, after the control section 2 calculates the data reading-out position X1 at the time of the FF command release, it judges whether the data of the frame position corresponding to the reading-out start position X1 is accumulated in the buffer memory 3, and when the data of the frame position corresponding to the reading-out start position X1 is accumulated in the buffer memory 3, the control section 2 controls to successively send the data from the frame position of the buffer memory 3 to the compression decoder 4, and further, when the data of the frame position corresponding to the reading-out start position X1 is not accumulated in the buffer memory 3, it controls to read the data of the solid state memory M again from the frame position corresponding to the reading-out start position X1, and successively send to the buffer memory 3, and also to the buffer memory 3, after the control section 2 controls to read out the data again from the frame position corresponding to the reading-out start position X1, and successively send to the compression decoder 4, it advances to step S16.

In step S16, after the control section 2 controls so that the compression decoder 4 conducts decode conversion processing on the data from the frame position supplied from the buffer memory 3 to the compression decoder 4, and outputs it, and after that, the control section 2 advances to step S17.

Next, in step S17, after the control section 2 stops the output of the RE signal from the address control signal generator 12 to the RAM 6 and the ADR signal at the time of the data reading out, it makes to output the WE signal and the ADR signal at the time of the data reading out from the address control signal generator 12 to the RAM 6, and it successively extracts the temporarily stored data from the bit number conversion data successively sent from the data extraction circuit 5 to the RAM 6, and renews and stores it in the RAM 6, and next, the control section 2 advances to the step S18.

In step S18, when the control section 2 controls to switch and select the input of the switching SW 8 to the output side of the compression decoder 4 and make the PCM audio data outputted from the compression decoder 4 output to the D/A converter 9, the control section 2 plays back the music by the data from the frame position corresponding to the reading-out start position X1, and after the control operation of the FF processing routine in FIG. 9 is completed, the control section 2 returns to the step S6 in FIG. 8 (RETURN).

Next, the quick returning play back operation of the display apparatus D1 according to the REW command will be described. While the play back apparatus D1 plays back the music, for example, when the user continues to press the quick returning (REW) button and the REW command is given, the control section 2 judges that the quick returning play back command is given, and when it interrupts the decode conversion processing of the compression decoder 4 corresponding to the start of the REW command, and stops the output from the compression decoder 4, the playback of the music is interrupted, and the measurement of the elapsed time from the REW command start is started.

Further, when the control section 2 stops the renewing and storing operation of the temporarily stored data to the RAM 6, and outputs the ADR signal at the time of the data reading out operation corresponding to the RE signal and the REW command from the address signal control generator 12 to the RAM 6, the control section 2 repeatedly reads out the temporarily stored data in the reversal direction of the RAM address to the order of the RAM address indicated at the time of the FF command, and successively outputs it as the output data corresponding to the REW command, and controls to supply it to the data correction circuit 7.

As the result, the data correction circuit 7 generates the special audio data corresponding to the quick returning play back command from the supplied output data and supplies it to the switching SW 8, Further, by the control of the control section 2 according to the REW command from the operation section 1, the switching SW 8 selects the special audio data successively supplied from the data correction circuit 7 and outputs to D/A converter 9. As the result, from the speaker 11, the special audio in which the quick returning play back sound of the audio information is converted into an imitation sound, is successively played back. Because this special audio is a sound in which the special audio in the quick returning play back operation is reversely played back, the user hears it as a squeaky sound played back when the music information by the analog audio signal recorded on, for example, the magnetic tape is quick returning played back by the analog tape recorder.

Next, while the play back apparatus D1 is conducting the quick returning play back operation, when the user stops pressing the quick returning (REW) button and the REW command is released, the control section 2 judges that the quick returning play back command is released, and calculates the time T2 from the REW command start to the REW command release, and by calculating the reading-out start position X2 of the data quick returned data by the REW command according to the time T2, the control section 2 controls to indicate again the frame position of the data read from the solid state memory M to the reading-out start position X2.

Herein, when a method for the control section 2 to calculate the reading-out position X2 of the data at the time of the REW command release, will be described, then, initially, the control section 2 calculates the time T2 from the REW command start to the REW command release, measured up to that time at the time of the REW command release, and by using the time T2, the reading-out position X2 of the data is calculated by the following relational expression (2).

$$X2 = L2 \cdot T2 \cdot S2 - Z2 \qquad (2)$$

In the above expression (2), L2 is the same variable as L1 in the expression (1). Further, S2 is a quick returning speed rate showing at what speed the data is quick returned by the REW command, and this is, in the same manner as S1 in the expression (1), reversely proportional to the ratio in which the partitioned data is thinned out from the bit number conversion data outputted from the data extraction circuit 5 by the WE signal outputted from the address control signal generator 12. Accordingly, as in the present embodiment, also in the REW command, when the partitioned data is thinned out from the bit number conversion data at the ratio of 4:1 by the WE signal, S2=4 in the same manner as in the case of S1. Further, Z2 expresses the frame number (N) of the reading-out leading position of the compression bit stream data from the buffer memory 3 at the time of REW command.

As can be seen from the above expression (2), the reading-out position X2 of the data expresses the frame number corresponding to the number in which the frame number of the data quick returned during the time T2 from the REW command start to the REW command release is added to the frame number at the time of the REW command start, and when the control section 2 indicates the reading-out of the data from the frame position corresponding to the reading-out position X2 of this data, to the solid state memory M and the buffer memory 3, the leading frame position of the data to be played back after the REW command release can be indicated.

Specifically, in the same manner as the case where the control section 2 indicates the data reading-out from the frame position corresponding to the reading-out position X1 calculated by the expression (1), the control section 2 generates the discrimination data of the frame corresponding to the frame number from the frame number expressed by the reading-out start position X2, and conducts the reading-out of the data from the frame position having the discrimination data, to the solid state memory M and buffer memory 3, and indicates.

The control section 2, succeeding to the control operation, conducts the control to read out again the data of the solid state memory M from the frame position corresponding to the reading-out start position X2 and successively send the data to the buffer memory 3, and also to the buffer memory 3, conducts the control to read out again the data from the frame position corresponding to the reading-out start position X2 and successively send the data to the compression decoder 4.

Further, in this case, when the control section 2 switches the switching SW 8 to the output side of the compression decoder 4 corresponding to the REW command release, the control section 2 controls to play back the PCM audio data from the frame position corresponding to the reading-out start position X2 outputted from the compression decoder 4.

Thereby, when the REW command is released, the play back apparatus D1 switches again the special audio played back while the quick returning play back command is given, to the audio by the audio information from the frame position corresponding to the reading-out start position X2 of the quick returned data, and can play back it.

Figure 10:
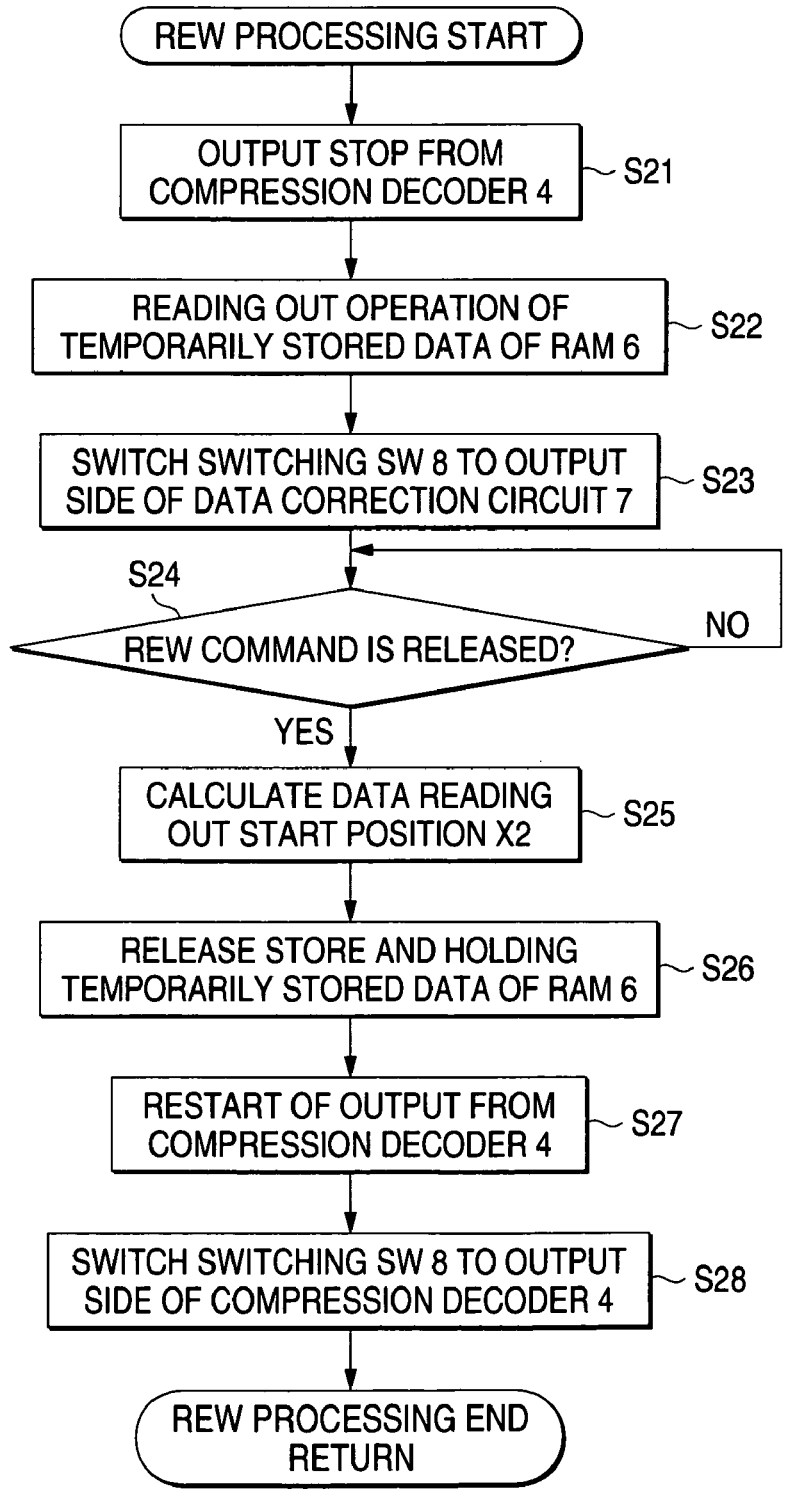
FIG. 10 is a view showing an operation flow chart of the control section in a REW processing routine.

FIG. 10 is a view showing a operation flow chart of the control section 2 in the REW processing routine. When this is described succeeding to the operation of step S8 shown in F8, initially, when the REW command is given in step S8 shown in FIG. 8, the control section 2 starts (START) the control operation of the REW processing routine shown in FIG. 10, and advances to step S21.

In step S21, the control section 2 interrupts the decode conversion processing of the compression decoder 4 in the same manner as described in step S11 in FIG. 9, and interrupts the play back of the music from the speaker 11 by stopping the output from the compression decoder 4, and starts the measurement of the elapsed time from the REW command start, and stops the WE signal from the address control signal generator 12 and the ADR signal at the data writing operation, and then, advances to step S22.

In step S22, when the control section 2 outputs the RE signal from the address control signal generator 12 to RAM 6 and the ADR signal at the time of the data reading out, the control section 2 controls in such a manner that the RAM 6 repeatedly outputs successively the temporarily stored data including m 8-bit data stored and held in m RAM addresses in step S11 in FIG. 9, in the order of the RAM addresses from Am−1toward AO which is reversed to the case of the data reading-out operation in step S12 in FIG. 9, and conducts the data reading out operation, and conducts the control operation to supply the output data to the data correction circuit 7, and after it controls in such a manner that the data correction circuit 7 generates the special audio data according to the output data and outputs to the switching SW 8, the control section 2 advances to step 23.

Next, in step S23, when the control section 2 switches the input of the switching SW 8 to the output side of the data correction circuit 7, the control section 2 controls in such a manner that the switching SW 8 selects the special audio data outputted from the data correction circuit 7 and successively outputs it, and the play back apparatus D1 plays back the special audio by the special audio data, and after that, the control section 2 advances to step S24. Thereby, from the speaker 11 of the play back apparatus D1, the special audio in which the quick returning play back sound is converted into an imitation sound, is successively repeatedly played back.

Next, the control section 2 is in a release waiting condition of the REW command instep S24, and when the REW command is released, the control section 2 judges that the quick returning play back command is released, and advances to step S25.

In step S25, after the control section 2 calculates the data reading-out position X2 at the time of the REW command release, it judges whether the data of the frame position corresponding to the reading-out start position X2 is accumulated in the buffer memory 3, and when the data of the frame position corresponding to the reading-out start position X2 is accumulated in the buffer memory 3, the control section 2 controls to successively send the data from the frame position of the buffer memory 3 to the compression decoder 4, and further, when the data of the frame position corresponding to the reading-out start position X2 is not accumulated in the buffer memory 3, it controls to read out the data of the solid state memory M again from the frame position corresponding to the reading-out start position X2, and successively send to the buffer memory 3, and also to the buffer memory 3, after the control section 2 controls to read out the data again from the frame position corresponding to the reading-out start position X2, and successively send to the compression decoder 4, it advances to step S26.

In step S26, after the control section 2 controls so that the compression decoder 4 conducts the decode conversion processing on the data from the frame position supplied from the buffer memory 3 to the compression decoder 4, and outputs it, and after that, the control section 2 advances to step S27.

Next, in step S27, after the control section 2 stops the output of the RE signal from the address control signal generator 12 to the RAM 6 and the ADR signal at the time of the data reading out, it makes to output the WE signal and the ADR signal at the time of the data reading out from the address control signal generator 12 to the RAM 6, and it successively extracts the temporarily stored data from the bit number conversion data successively sent from the data extraction circuit 5 to the RAM 6, and renews and stores it in the RAM 6, and next, the control section 2 advances to the step S28.

In step S28, when the control section 2 controls to switch and select the input of the switching SW 8 to the output side of the compression decoder 4 and make the PCM audio data outputted from the compression decoder 4 output to the D/A converter 9, the control section 2 plays back the music by the data from the frame position corresponding to the reading-out start position X2, and after the control operation of the REW processing routine in FIG. 9 is completed, the control section 2 returns to the step S6 in FIG. 8 (RETURN).

As described above, the special audio data at the time of quick traverse play back command and the special audio data at the time of quick returning play back command are the 16-bit PCM audio data in which the 16-bit PCM audio data is thinned out in the time direction and a portion of the audio information is lacked and the audio information of the lower rank 8-bit is lacked also in the quantization direction, because the following processing is conducted: the RAM 6 further thins out and extracts the bit number conversion data generated by the operation by which the higher rank 8-bit data of the 16-bit PCM audio data successively outputted from the compression decoder 4 at the time of the ordinary play back operation of the play back apparatus D1 at a predetermined frame interval by the control of the control section 2, and each data of extracted 8-bits is successively renewed and stored in the RAM address as the temporarily stored data, and after the control section 2 stores and holds the temporarily stored data which is renewed and stored in the RAM 6 at the time corresponding to the FF command (or the REW command), the temporarily stored data is successively repeatedly read out in the reading-out order corresponding to FF command (or REW command) and supplied to the data correction circuit 7, and because the data correction circuit 7 respectively adds the 0 data of the lower rank 8 bits to the successively supplied temporarily stored data, thereby, it is generated as the special audio.

Accordingly, in the analog audio signal in which these special audio data is D/A converted by the D/A converter 9 and generated, the audio information of the higher rank 8-bit of the 16-bit PCM audio data outputted from the compression decoder 4 is included in the condition that it is further thinned out in the time direction.

As the result, after this analog signal is amplified by the amplifier 10, the special audio played back from the speaker 11 is as follows. When by the quick traverse play back command, the play back sound of the audio information by the ordinary play back operation is quickly traversed by an amount in which the PCM audio data is thinned out in the time direction, and the audio in which the quick traverse play back audio which is intermittently played back is converted into an imitation sound, is a continuously repeated audio, further, when by the quick returning play back command, the play back sound of the audio information by the ordinary play back operation is quickly returned by an amount in which the PCM audio data is thinned out in the time direction, and the audio in which the quick returning play back audio which is intermittently played back is converted into an imitation sound, is a continuously repeated audio.

Accordingly, at the time of the quick traverse play back command (or at the time of the quick returning play back command) from the operation section 1, because the user can hear the special audio which hears like that the play back audio of the audio information is more quickly played back (or, more quickly reversely played back) than that at the time of the ordinary play back operation, the user can easily confirm in the hearing sense that the play back apparatus conducts the quick traverse processing (or, quick returning processing) of the data.

In this connection, as described above, the analog audio signal in which the special audio data at the time of quick traverse play back command and the special audio data at the time of the quick returning play back command are D/A converted by the D/A converter 9 and generated, is generated, in the case by either one command, as the analog audio signal in which the audio information of the lower rank 8-bit of the 16-bit PCM audio data outputted from the compression decoder 4 is lacked.

Accordingly, the special audio played back by these analog audio signal outputted from the D/A converter 9 is the audio in which the audio is lacked by a lacked portion of the analog audio signal by the audio information of the lower rank 8-bit, and because the user can hear the special audio being interlocked with the pressing movement which is conducted by the user on the FF button or the REW button at the time, when the user is pressing the FF button, the user can recognize the special audio at the case as the quick returning sound of the audio information, further, when the user is pressing the REW button, because the user can recognize the special audio at the case as the quick returning sound of the audio information, the user can hear the special audio corresponding to the button on which the user is pressing, without any strange feeling.

Further, as described above, the special audio data at the time of the quick traverse play back command (or, at the time of the quick returning play back command) can be played back in such a manner that, by the control of the control section 2, the temporarily stored data renewed and stored at the FF command (or, at the REW command) in the RAM 6 is stored and held, and because the stored and held temporarily stored data is repeatedly read out and successively outputted as the output data in the order of the arrangement of the RAM addresses indicated by the control section 2, by the special audio data generated according to the output data, the play back apparatus can play back the special audio according to the audio information near the audio played back by the ordinary play back operation just before the command. As the result, at the time of the command, the user can hear the special audio, succeeding to the audio played back by the ordinary play back operation just before the command, without any strange feeling.

In the playback apparatus D1 in the above first embodiment, the system is structured in such a manner that, as described in step S1 and step S2 in FIG. 8, when the power source of the play back apparatus D1 is turned ON in the condition that the temporarily stored data does not exist in the RAM 6 of the play back apparatus D1, before the control operation corresponding to the playback command, the control section 2 previously reads out the compression bit stream data from the fixed memory M, and according to a portion of the read out compression bit stream data, the control section controls to generate the temporarily stored data, and to store and hold the temporarily stored data in the RAM 6 as the first storage section, however, in order to generate the bit number conversion data supplied to the RAM 6 from a portion of the compression bit stream data read from the fixed memory M and to supply it to the RAM 6, the control operation to accumulate once the compression bit stream data read from the fixed memory M in the buffer memory 3, the control operation to supply a portion of the compression bit stream data accumulated in the buffer memory 3 to the compression decoder 4 and to conduct the decode conversion processing of the data by the compression decoder 4, and the control operation to conduct the extraction processing of the bit number conversion data by the data extraction circuit 5, are necessary, and a considerable time is necessary for these processing.

Accordingly, from the time when, for example, the user turns ON the power source of the play back apparatus D1 which is in the condition that the temporarily stored data is not stored and held in the RAM 6, when the user conducts the quick traverse play back command by simultaneously conducting the play back command and the FF command in the sorter time than the time necessary for the control operation in which the control section 2 stores and holds the temporarily stored data in the RAM 6, the quick traverse play back command is given when the play back apparatus D1 is in the condition that the temporarily stored data is not yet stored in each of the RAM addresses of the RAM 6, and as the result, in the play back apparatus D1, the temporarily stored data is stored and held in each of the RAM addresses of the RAM 6 after the FF command, and for a several time up to the time in which the special audio data according to the temporarily stored data is generated, the silent time in which the quick traverse play back sound is interrupted, is generated, and there is sometime a case in which the strange feeling due to that remains a few for the user. This can be the same also in the case where, after the user turns ON the power source of the apparatus, for example, the quick returning play back command is conducted by conducting the play back command and the REW command in the shorter time than the processing time.

In these cases, for example, the play back apparatus may be structured in such a manner that the second storage section such as a ROM to store and hold the default data including the non-compression PCM audio data to generate the temporarily stored data, is provided in the play back apparatus, and the control section of the play back apparatus controls to read out the default data from the second storage section in the above case, and according to the default data, to generate the temporarily stored data, and the temporarily stored data is previously stored and held in the RAM 6 before the play back command.

That is, when the play back apparatus previously stores and holds the default data including the non-compression audio data in the second storage section, even when, for example, the FF command is given in addition to the play back command, just after the power source of the apparatus is turned ON, by the control of the control section, because the play back apparatus can rapidly supply the default data of the second storage section to the RAM 6 as the temporarily stored data, the special audio according to the temporarily stored data can be emitted from the speaker 11, and the user can hear it. An example of such the play back apparatus will be described by the following second embodiment.

Figure 11:
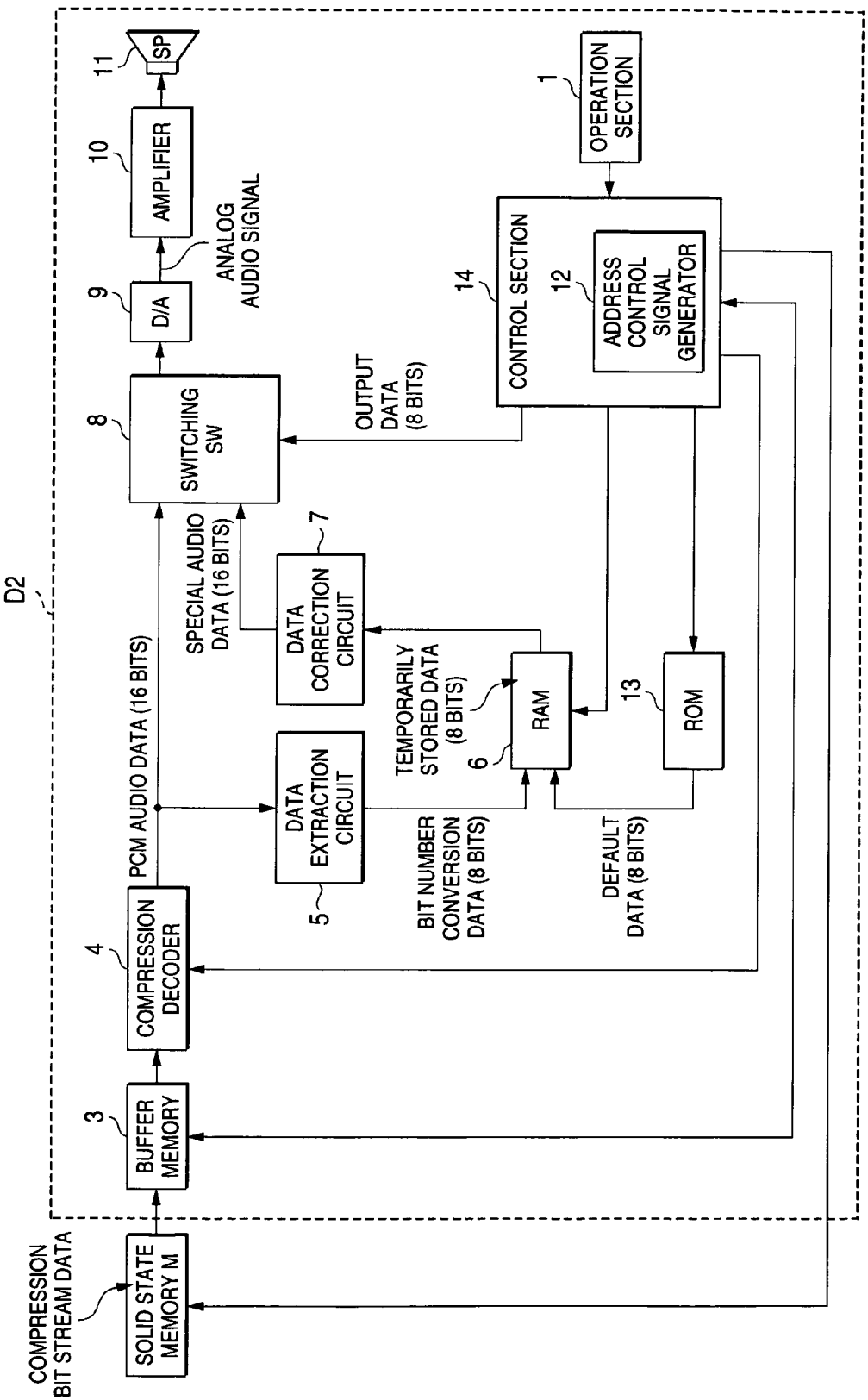
FIG. 11 is an outline block diagram of a playback apparatus D2 in the second embodiment of the present invention.

FIG. 11 is an outline block diagram of a play back apparatus D2 in the second embodiment of the present invention, herein, in the same manner as in the play back apparatus D1 in FIG. 1, FIG. 11 is shown by a block diagram of the play back apparatus D2 when the solid state memory M as the storage medium is equipped.

In FIG. 11, the play back apparatus D2 is, to each structure of the play back apparatus D1 in FIG. 1, structured in such a manner that the control section 2 is replaced with a control section 14, and a ROM 13 as the second storage section is added to that.

In this connection, in each of structures of the play back apparatus D2 shown in FIG. 11, for the same components as in the play back apparatus D1 in FIG. 1, the same numerical codes are denoted, and because these explanations are duplicated, these will be omitted herein. Accordingly, the play back apparatus D2 will be described below centering around the ROM 13 and the control section 14.

The ROM 13 always stores and holds the default data. The default data is, for example, in the same manner as the bit conversion data outputted from the date extraction circuit, including the 8-bit non-compression PCM audio data to play back the special audio in which the quick traverse play back audio and quick returning play back audio of the audio information are converted into an imitation sound, and herein, it is structured by m partitioned data D'm (=D'0, D'1, D'2, D'3, D'm−1) in timed relationship with a predetermined number of the clock periods of the PCM clock of a predetermined frequency (48 kHz) generated by the control section 14.

Further, the control section 14 has, in the same manner as the control section 2 in the play back apparatus D1, the address control signal generator 12, and according to the command from the operation section 1, it appropriately outputs the control signal such as the ADR signal in timed relationship with the clock period of the PCM clock from the address control signal generator 12, WE signal, RE signal, and controls each section.

Next, the control operation of the control section 14 will be described.

Figure 12:
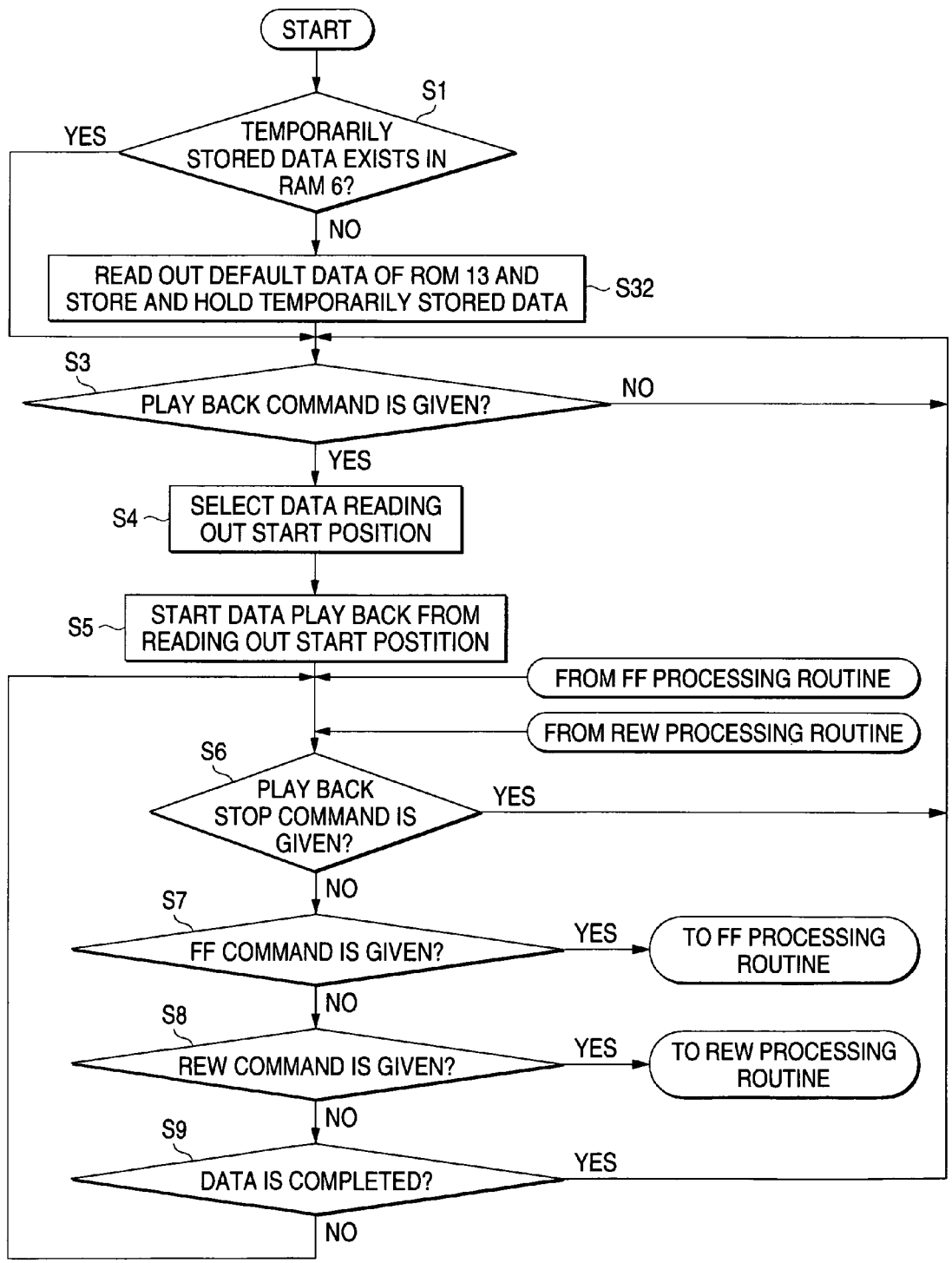
FIG. 12 is a view showing a flow chart of a play back control operation of the control section according to a command from the control operation of the play back apparatus D2.
Figure 13:
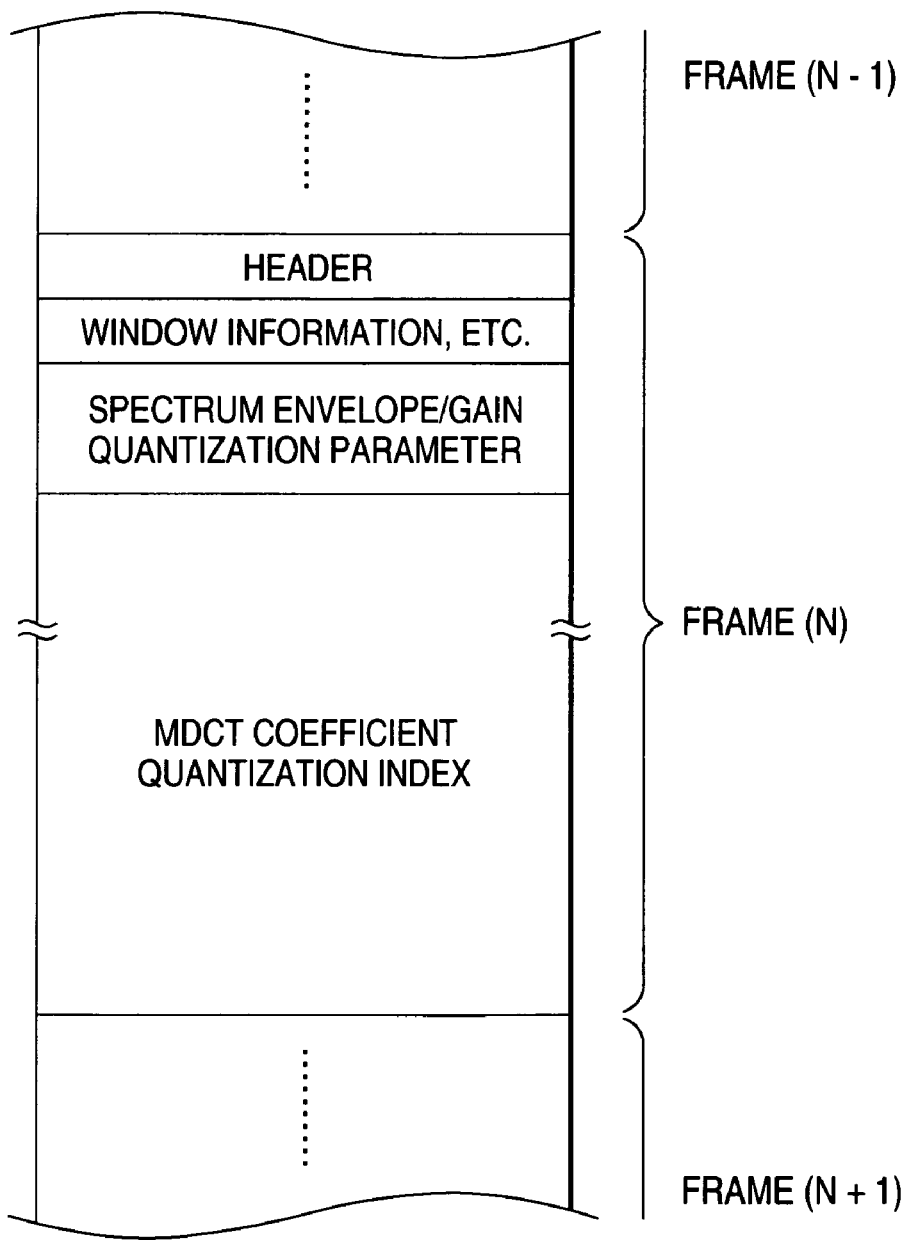
FIG. 13 is a view showing an example of the physical format of a compression bit stream data by an MPEG audio system.

FIG. 12 is a view showing a flow chart of the play back control operation of the control section 14 according to the command from the operation section 1 of the play back apparatus D2. In this connection, in each step of control operations of the control section 14 shown in FIG. 12, for the same control operation step as each control operation step conducted by the control section 2 in FIG. 8, the same step code is denoted, and herein, because its explanation is duplicated, it will be neglected. Accordingly, the control operation of the control section 14 in that case is explained by replacing the control section 2 in the explanation of the control operation step of the control section 2 with the control section 14.

In FIG. 12, initially, when the power source of the play back apparatus D2 is turned ON, the control section 14 starts (START) the control of each section, and advances to step S1, and judges whether the temporarily stored data exists in the RAM 6. In step S1, when the temporarily stored data does not exist in the RAM 6, the control section 14 advances to step S32.

In step S32, the control section 14 conducts the control operation to successively read out the default data including m partitioned data D'm (=D'0, D'1, D'2, D'3, D'm−1) stored and held in ROM 13 from the ROM 13 in timed relationship with the PCM clock, and successively supplies the read-out default data to the RAM 6 for each partitioned data, and stores and holds it in the order of m RAM addresses (A0~Am−1) of the RAM 6 as the temporarily stored data. As the result, in the RAM address AO, the data D'0 is stored and held, and in the RAM address A1, the data D'1 is stored ands held, and hereinafter, in the same manner, in the RAM address Am−1, the data D'm−1 is stored and held.

As described above, the control operation conducted by the control section 14 in step S32, is an operation by which m partitioned data D'm (=D'0, D'1, D'2, D'3, . . . , D'm−1) including 8-bit non-compression PCM audio data is read from the ROM 13, and successively stores and holds it in m RAM addresses of the RAM 6, and the speed of the control operation 14 is higher than that of the operation by which, after the control section 2 in the play back apparatus D1, in step S2, reads out a portion of the compression bit stream data from the solid state memory M, and according to it, the bit number conversion data including the non-compression PCM audio data is generated, the bit number conversion data is successively supplied to m RAM addresses of the RAM 6 in timed relationship with the PCM clock and stored and held. After the operation of the step 32, the control section 14 advances to step S3.

Further, in step S1, when the temporarily stored data exists in the RAM 6, the control section 14 advances to step S3.

Further, the control operations of the control section 14 in each of steps (S3–S9) subsequent to step S3 in FIG. 12 are respectively the same as the control operation of the control section 2 in each step subsequent to the step S3 in FIG. 8.

Further, in step S7 in FIG. 12, the control section 14 judges that quick traverse play back command is given when the FF command is given, and on the temporarily stored data stored and held in RAM 6, that is, m partitioned data D'm (=D'0, D'1, D'2, D'3, . . . , D'm−1) stored and held in m RAM addresses of the RAM 6, the same control operation as the control operation of the control section 2 in the FF processing routine in FIG. 9 is conducted.

Further, in step S8 in FIG. 12, the control section 14 judges that the quick returning play back command is given when the REW command is given, and on m partitioned data D'm (=D'0, D'1, D'2, D'3, . . . , D'm−1) stored and held in m RAM addresses of the RAM 6, the same control operation as the control operation of the control section 2 in the REW processing routine in FIG. 10 is conducted.

Because the play back apparatus D2 is structured as described above, for example, even when the user conducts the quick traverse play back command (or, quick returning play back command) by almost simultaneously conducting the play back command and the FF command (or, REW command) just after the power source of the play back apparatus D2 is turned ON, by the control of the control section 14, because the play back apparatus D2 can quickly supply the default data in the ROM 13 to the RAM 6 as the temporarily stored data which is necessary for generating the special audio for 5 seconds, and stores and holds it within a short time from the turning ON of the power supply to the time of quick reverse play back (or, quick returning play back), by repeatedly playing back the special audio generated according to the default data, the quick traverse play back audio (or, quick returning play back audio) is emitted from the speaker 11 and the use can hear it. As the result, in the play back apparatus D2, even just after the quick traverse play back command (or, the quick returning play back command), because the quick traverse playback audio (or, quick returning play back audio) is not interrupted, the user can hear the special audio without any strange feeling.

In this connection, in each of embodiments described above, the compression data is described as the compression bit stream data, in which the fixed length frame in which the audio information is coded by the MPEG audio system, has a header for each frame and is continuously formed, however, the compression data in the present invention is not limited to this, but, when the compression data for each partitioned data such as a frame is formed of the continuous data structure, and each partitioned data is structured such that it has an identification information such as a header to identify its leading position from the leading position of the other partitioned data, the compression data may be the data by the compression coding method of the other data.

Further, in each of embodiments described above, the compression bit stream data is a frame structure in which the fixed bit is allotted to each frame, however, the compression bit stream data as the compression data may not always be a structure in which the fixed bit is allotted to each frame, but, it may also be a structure in which a variable bit is allotted.

Further, in each of embodiments described above, the play back apparatus is structured so as to conduct the play back of the monaural audio according to the compression bit stream data for the monaural audio play back stored and held in the solid state memory M, however, in the present invention, the structure to play back the stereo audio according to the compression bit stream for the stereo audio play back when, in the solid state memory M, the compression bit stream for the stereo audio play back in which, for example, the frame data for the left channel and the frame data for the right channel are alternately continuously structured, is recorded, may also be allowed, and in that case, the compression decoder 4 decodes the compression bit stream data successively supplied from the buffer memory, and outputs the PCM audio data for the left channel and for the right channel, and plays back the stereo audio according to these two PCM audio data outputs. In the case of the structure in which the play back apparatus plays back the stereo audio, the data extraction circuit 5 may also be structured in such a manner that the bit number conversion data is generated according to the PCM audio data for any of the left or right channel in the two PCM audio data outputted from the compression decoder 4, and further, the bit number conversion data is generated according to the data to which these two PCM audio data is added.

Further, in the play back apparatus D2 in the second embodiment, the default data stored and held by the ROM 13 is the 8-bit non-compression PCM audio data structured by m partitioned data D'm (=D'0, D'1, D'2, D'3, . . . , D'm−1) in timed relationship with a predetermined number of the clock periods of the PCM clock of a predetermined frequency (48 kHz) generated by the control section 14, and the default data is structured such that, by the control of the control section 14 at need, the temporarily stored data is stored and held in the RAM 6 according to m partitioned data, however, the default data in the present invention is not limited to this, for example, it maybe structured by the PCM audio data including the a plurality of m partitioned data to play back the plurality of different special audio respectively for 5 seconds. In that case, a plurality of sets of default data are stored and held in ROM 13, and at the time of the quick traverse play back command or quick returning play back command, by the control of the control section 14, a set of default data in these plurality of sets of default data is appropriately selected, and stored and held as the temporarily stored data in the RAM 6, and the special audio according to the temporarily stored data can be appropriately and repeatedly played back.

Further, in each of embodiments described above, the play back apparatus is structured such that the quick traverse play back command is given by conducting the FF command in addition to the play back command from the operation section 1, and further, the quick returning play back command is given by conducting the REW command in addition to the play back command, however, the present invention is not limited to this, but, for example, it may also be structured such that the quick traverse play back play back button and the quick returning play back button are respectively provided in the operation section 1, and while the user presses appropriately the quick traverse play back button, the quick traverse play back command is given to the control section, and while the user presses the quick returning play back button, the quick returning play back command is given to the control section.

[Effect of the Invention]

According to the invention described in the first aspect, while the play back apparatus is conducting an ordinary play back operation of the audio according to the compression data in which the audio information is coded, the control section generates each time the temporarily stored data according to the PCM audio data successively outputted from the compression decoder, and renews and stores it in the first storage section, and when the quick traverse playback command (or quick returning play back command) is given from the operation section, because the control section controls so that the switching section selects the special audio data generated according to the temporarily stored data and outputs it, and conducts the control of the play back operation of the special audio data according to the special audio data, the play back apparatus can play back the special audio according to the special audio data corresponding to the quick traverse play back command or quick returning play back command, instead of the audio at the ordinary play back time. As the result, the user can easily confirm in the hearing sense that the play back apparatus is quick traverse processing (or quick returning processing) the data.

Further, according to the invention described in the second aspect, while the quick traverse play back command (or the quick returning play back command) from the operation section is conducted, because the play back apparatus plays back the special audio in which the quick traverse play back sound (or the quick returning play back sound) is converted into an imitation sound, the user can easily confirm in the hearing sense that the apparatus is quick traverse playing back (or quick returning playing back) the data.

Further, according to the invention described in the third aspect, while the quick traverse play back command (or the quick returning play back command) from the operation section is conducted, the special audio data is generated according to the temporarily stored data obtained by extracting the PCM audio data outputted from the compression decoder at a predetermined interval, and the special audio according to the special audio data is played back from the play back apparatus. Accordingly, because the user can hear the special audio which hears like that the play back sound according to the audio information is thinned out in the quick traverse direction (or quick returning direction) corresponding to the quick traverse play back command (or, quick returning play back command), the user can easily confirm in the hearing sense that the apparatus is quick traverse playing back (or quick returning playing back) the data.

Further, according to the invention described in the fourth aspect, during the ordinary play back operation, the first storage section renews and stores the temporarily stored data successively generated according to the PCM audio data successively generated from the compression decoder in the predetermined number of storage addresses in the arrangement order of the storage addresses indicated by the control section, and when the quick traverse playback command (or quick returning play back command) is given by the operation section, because the first storage section stores and holds the temporarily stored data which is renewed and stored when the command is given, and the stored and held temporarily stored data is repeatedly read out in the arrangement order of the storage addresses indicated by the control section, and successively outputted as the output data, the play back apparatus can play back the special audio according to the audio information close to the audio played back by the ordinary play back operation just before the command, by the special audio data generated according to the output data. As the result, the user can hear the special audio played back when the command is given, without strange feeling, succeeding to the audio played back by the ordinary play back operation just before the command.

Further, according to the invention described in the fifth aspect, when the play back apparatus is commanded to quick traverse play back, the special audio hearing as if the audio information is thinned out in the quick traverse direction, by the special audio data outputted from the switching section can be played back. Accordingly, when the user hears these special audio, the user can easily confirm in the hearing sense that the apparatus is quick traverse processing the data.

Further, according to the invention described in the sixth aspect, when the play back apparatus is commanded to quick traverse play back, the apparatus can play back the special audio hearing as if the audio information is thinned out in the quick traverse direction by the special audio data outputted from the switching section. Accordingly, when the user hears the special audio, the user can easily confirm in the hearing sense that the apparatus is quick traverse processing the data.

Further, according to the invention described in the seventh aspect, when the power source of the playback apparatus is turned on in the condition that the temporarily stored data is not stored and held in the first storage section of the play back apparatus, before the control operation corresponding to the play back command, because the control section previously reads out the compression data from, for example, the fixed memory M, and controls so as to generate the temporarily stored data according to a portion of the read out compression data, and the temporarily stored data is stored and held in the first storage section, for example, when the user gives the quick traverse play back command (or quick returning play back command) by the operation section of the play back apparatus whose power source is already turned on, the play back apparatus can quickly play back the special audio by the quick traverse play back command (or quick returning play back command), according to the temporarily stored data stored and held in the first storage section, by the control of the control section. As the result, because, even just after the quick traverse play back command (or quick returning play back command) by the user, the play back sound by the special audio is not intermitted, the user can hear the special audio without any feeling of difference.

Further, according to the invention described in the eighth aspect, because, when the power source of the play back apparatus is turned on under the condition that the temporarily stored data is not stored and held in the first storage section of the play back apparatus, the control section quickly reads out the default data from the second storage section before the control operation corresponding to the play back command, and stores and holds the temporarily stored data according to the read-out default data in the first storage section, for example, even when the user conducts the quick traverse play back command (or quick returning play back command) just after the power source of the play back apparatus is turned on, the play back apparatus can quickly play back the special audio by the quick traverse play back command (or quick returning play back command) according to the temporarily stored data stored and held in the first storage section by the control of the control section. As the result, because even just after the quick traverse play back command (or quick returning play back command) by the user, the play back sound by the special audio is not intermitted, the user can hear the special audio without any feeling of difference.

Further, according to the invention described in the ninth aspect, because, while the quick traverse play back command (or quick returning play back command) is conducted when the play back apparatus is ordinarily play back-operated, the play back apparatus plays back the special audio in which the quick traverse play back sound (or the quick returning playback sound) of the audio information is converted into an imitation sound by the temporarily stored data generated according to the default data, the user can easily confirm in the hearing sense that the apparatus is quick traverse processing (or quick returning processing).

What is claimed is:

1. A play back apparatus in which, according to a play back command from an operation section, the PCM audio data is generated from compression data in which the audio information is coded, and an audio is played back according to the PCM audio data, said play back apparatus comprising:
a control section for conducting the control of each section of said apparatus according to each kind of commands from an operation section;
a compression decoder for decode processing the compression data, generating the PCM audio data, and successively outputting thereof;
a first storage section for successively renewing the temporarily stored data successively generated according to the PCM audio data and temporality storing thereof, and appropriately repeatedly reading out the temporarily stored data which is temporarily stored, and successively outputting thereof; and
a switching section for selecting either one of the PCM audio data successively outputted from said compression decoder or the temporarily stored data stored in said first storage section, and outputting thereof, wherein
when a quick traverse play back command or quick returning play back command is given by said operation section, (1) said control section controls said switching section and selectively outputs the temporarily stored data stored in said first storage section and (2) said switch section outputs a special audio data, wherein the special audio data is an imitation sound into which the quick traverse play-back of the audio information is converted.

2. The play back apparatus according to claim 1, wherein the temporarily stored data includes the PCM audio data to play back the special audio data in which the quick traverse play-back audio, or the quick returning play-back audio of the audio information is converted into an imitation sound.

3. The play back apparatus according to claim 1, wherein the temporarily stored data includes the data obtained by extracting the PCM audio data outputted from said compression decoder at a predetermined interval.

4. The play back apparatus according to claim 1, wherein said first storage section includes a predetermined number of storage addresses, and successively reads in the temporarily stored data successively generated according to the PCM audio data successively outputted from said compression decoder, and successively stores in the address specified by said control section.

5. The play back apparatus according to claim 1, wherein when the quick traverse play back command is given by said operation section, the temporarily stored data stored in said first storage section is repeatedly read out in the stored order and successively outputted as the output data.

6. The play back apparatus according to claim 1, wherein when the quick returning play back command is given by said operation section, the storing temporarily stored data is repeatedly read out in the order reversed to the stored order, and successively outputted as the output data.

7. The play back apparatus according to claim 1, wherein said control section controls in such a manner that, before the each kind of command is given from said operation section, said control section judges whether the temporarily stored data is already stored in said first storage section, and when it is judged that the temporarily stored data is not yet stored in said first storage section, said control section makes the decode processing of the compression data by said compression decoder start, and generates the PCM audio data, and makes the PCM audio data successively output from said compression decoder, and makes the temporarily stored data generated according to the PCM audio data, temporarily stored in said first storage section.

8. The play back apparatus according to claim 1, further comprising:

a second storage section for storing the default data including the PCM audio data having a predetermined data amount, wherein said control section controls in such a manner that, before each kind of command is given from said operation section, said control section judges whether the temporarily stored data is already stored in said first storage section, and when it is judged that the temporarily stored data is not yet stored in said first storage section, the temporarily stored data according to the default data stored in said second storage section is read in said first storage section, and temporarily stored.

9. The play back apparatus according to claim 8, wherein the default data includes the PCM audio data to play back the special audio data in which the quick traverse play back audio, or the quick returning play back audio of the audio information is converted into an imitation sound.

10. The play back apparatus according to claim 1, further comprising:

a special audio data generating section for generating the special audio data from the temporarily stored data repeatedly supplied from the first storage section and supplying thereof to the switching section.

11. A play back apparatus in which, according to a play back command from an operation section, the PCM audio data is generated from compression data in which the audio information is coded, and an audio is played back according to the PCM audio data, said play back apparatus comprising:

a control section for conducting the control of each section of said apparatus according to each kind of commands from an operation section;

a compression decoder for decode processing the compression data, generating the PCM audio data, and successively outputting thereof;

a first storage means for successively renewing the temporarily stored data successively generated according to the PCM audio data and temporality storing thereof, and appropriately repeatedly reading out the temporarily stored data which is temporarily stored, and successively outputting thereof; and a switching means for selecting either one of the PCM audio data successively outputted from said compression decoder or the temporarily stored data stored in said first storage means, and outputting thereof, wherein when a quick traverse play back command or quick returning play back command is given by said operation section, (1) said control section controls said switching means and selectively outputs the temporarily stored data stored in said first storage means and (2) said switch means outputs a special audio data, wherein the special audio data is an imitation sound into which the quick traverse play-back of the audio information is converted.

12. The play back apparatus according to claim 11, wherein the temporarily stored data includes the PCM audio data to play back the special audio data in which the quick traverse play-back audio, or the quick returning play-back audio of the audio information is converted into an imitation sound.

13. The play back apparatus according to claim 11, wherein the temporarily stored data includes the data obtained by extracting the PCM audio data outputted from said compression decoder at a predetermined interval.

14. The play back apparatus according to claim 11, wherein said first storage means includes a predetermined number of storage addresses, and successively reads in the temporarily stored data successively generated according to the PCM audio data successively outputted from said compression decoder, and successively stores in the address specified by said control section.

15. The play back apparatus according to claim 11, wherein
when the quick traverse play back command is given by said operation section, the temporarily stored data stored in said first storage means is repeatedly read out in the stored order and successively outputted as the output data.

16. The play back apparatus according to claim 11, wherein
when the quick returning play back command is given by said operation section, the storing temporarily stored data is repeatedly read out in the order reversed to the stored order, and successively outputted as the output data.

17. The play back apparatus according to claim 11, wherein
said control section controls in such a manner that, before the each kind of command is given from said operation section, said control section judges whether the temporarily stored data is already stored in said first storage means, and
when it is judged that the temporarily stored data is not yet stored in said first storage means, said control section makes the decode processing of the compression data by said compression decoder start, and generates the PCM audio data, and makes the PCM audio data successively output from said compression decoder, and makes the temporarily stored data generated according to the PCM audio data, temporarily stored in said first storage means.

18. The play back apparatus according to claim 11, further comprising:
a second storage means for storing the default data including the PCM audio data having a predetermined data amount, wherein
said control section controls in such a manner that, before each kind of command is given from said operation section, said control section judges whether the temporarily stored data is already stored in said first storage means, and
when it is judged that the temporarily stored data is not yet stored in said first storage means, the temporarily stored data according to the default data stored in said second storage means is read in said first storage means, and temporarily stored.

19. The play back apparatus according to claim 18, wherein
the default data includes the PCM audio data to play back the special audio data in which the quick traverse play back audio, or the quick returning play back audio of the audio information is converted into an imitation sound.

20. The play back apparatus according to claim 11, further comprising:
a special audio data generating section for generating the special audio data from the temporarily stored data repeatedly supplied from the first storage means and supplying thereof to the switching means.

* * * * *